US011865718B2

(12) United States Patent
Marui et al.

(10) Patent No.: US 11,865,718 B2
(45) Date of Patent: Jan. 9, 2024

(54) WORKING DEVICE USING PARALLEL LINK MECHANISM AND CONTROL METHOD THEREOF

(71) Applicant: NTN CORPORATION, Osaka (JP)

(72) Inventors: Naoki Marui, Iwata (JP); Hiroshi Isobe, Iwata (JP)

(73) Assignee: NTN CORPORATION, Osaka (JP)

( * ) Notice: Subject to any disclaimer, the term of this patent is extended or adjusted under 35 U.S.C. 154(b) by 769 days.

(21) Appl. No.: 17/000,786

(22) Filed: Aug. 24, 2020

(65) Prior Publication Data
US 2020/0384642 A1 Dec. 10, 2020

Related U.S. Application Data

(63) Continuation of application No. PCT/JP2019/007126, filed on Feb. 25, 2019.

(30) Foreign Application Priority Data

Feb. 26, 2018 (JP) .................. 2018-031748

(51) Int. Cl.
*B25J 9/16* (2006.01)
*B25J 9/04* (2006.01)
*B25J 13/08* (2006.01)

(52) U.S. Cl.
CPC ............. *B25J 9/1651* (2013.01); *B25J 9/046* (2013.01); *B25J 13/088* (2013.01)

(58) Field of Classification Search
CPC ........ B25J 9/1651; B25J 9/046; B25J 13/088; B25J 9/1623; B25J 9/163; B25J 9/1653; B25J 9/1682; B25J 9/0048
See application file for complete search history.

(56) References Cited

U.S. PATENT DOCUMENTS 7,129,665 B2  10/2006 Ando
9,394,979 B2   7/2016 Yamada et al.
(Continued)

FOREIGN PATENT DOCUMENTS

CN  104203502 A  12/2014
JP    11-48091 A   2/1999
(Continued)

OTHER PUBLICATIONS

International Preliminary Report on Patentability dated Sep. 3, 2020, in corresponding International Patent Application No. PCT/JP2019/007126.
(Continued)

*Primary Examiner* — Thomas Randazzo

(57) ABSTRACT

A working device includes a link actuation device and a control device for the link actuation device. The control device includes: a storage unit configured to store a plurality of the target positions; a calculation unit configured to sequentially read out the respective target positions stored to calculate movement amounts and movement speeds of the respective actuators between the target positions; and a control unit configured to operate the respective actuators by the movement amounts and at the movement speeds of the respective actuators calculated by the calculation unit. The control unit is capable of changing acceleration and deceleration times of the actuators for each of the target positions.

14 Claims, 21 Drawing Sheets

(56) References Cited

U.S. PATENT DOCUMENTS

| | | | |
|---|---|---|---|
| 9,522,469 B2* | 12/2016 | Isobe | B25J 9/1623 |
| 9,937,620 B2 | 4/2018 | Yamaoka et al. | |
| 10,065,310 B2 | 9/2018 | Sakata et al. | |
| 2005/0038563 A1* | 2/2005 | Rauf | B25J 9/1623 |
| | | | 700/245 |
| 2005/0146301 A1 | 7/2005 | Ando | |
| 2005/0159075 A1* | 7/2005 | Isobe | B25J 9/0048 |
| | | | 446/104 |
| 2012/0296471 A1 | 11/2012 | Inaba et al. | |
| 2014/0305244 A1 | 10/2014 | Yamada et al. | |
| 2015/0088308 A1* | 3/2015 | Isobe | B25J 9/12 |
| | | | 700/245 |
| 2015/0114149 A1 | 4/2015 | Gomi et al. | |
| 2016/0361816 A1 | 12/2016 | Sakata et al. | |
| 2017/0106535 A1 | 4/2017 | Yamaoka et al. | |
| 2017/0268640 A1* | 9/2017 | Sakata | F16H 21/48 |
| 2019/0047159 A1* | 2/2019 | Isobe | B25J 9/0087 |
| 2019/0105769 A1* | 4/2019 | Nose | B25J 17/0216 |
| 2019/0152046 A1* | 5/2019 | Konagai | B25J 5/04 |
| 2019/0255700 A1* | 8/2019 | Nose | B25J 9/0087 |
| 2019/0384233 A1* | 12/2019 | Iwase | B25J 11/00 |

FOREIGN PATENT DOCUMENTS

| | | |
|---|---|---|
| JP | 2000-127068 A | 5/2000 |
| JP | 2002-321178 A | 11/2002 |
| JP | 2005-196488 A | 7/2005 |
| JP | 2007-955 | 1/2007 |
| JP | 4528577 B2 | 8/2010 |
| JP | 2013-198942 A | 10/2013 |
| JP | 2015-155124 A | 8/2015 |
| JP | 5785055 B2 | 9/2015 |
| JP | 2015-188945 A | 11/2015 |
| JP | 5864322 B2 | 2/2016 |
| JP | 2017-74647 A | 4/2017 |

OTHER PUBLICATIONS

Chinese Office Action issued in Chinese Application No. 201980014977.X dated Jan. 13, 2023.
Notice of Reasons for Refusal dated Jan. 11, 2022 in Japanese Patent Application No. 2018-031748.
Extended European Search Report dated Nov. 19, 2021 in European Patent Application No. 19757273.8.
International Search Report dated May 21, 2019, in corresponding International Patent Application No. PCT/JP2019/007126.

* cited by examiner

| TARGET POSITION P | POSTURE OF DISTAL-SIDE LINK HUB | ACCELERATION AND DECELERATION TIME |
|---|---|---|
| P1 | $\theta_{p1}\,\phi_{p1}$ | $T_{p1}$ |
| P2 | $\theta_{p2}\,\phi_{p2}$ | $T_{p2}$ |
| P3 | $\theta_{p3}\,\phi_{p3}$ | $T_{p3}$ |
| P4 | $\theta_{p4}\,\phi_{p4}$ | $T_{p4}$ |
| P5 | $\theta_{p5}\,\phi_{p5}$ | $T_{p5}$ |

| BEND ANGLE | TURN ANGLE | ACCELERATION AND DECELERATION TIME |
|---|---|---|
| 0 | 0 | $T_{0,0}$ |
| | 5 | $T_{0,5}$ |
| | 10 | $T_{0,10}$ |
| | 15 | $T_{0,15}$ |
| | ⋮ | ⋮ |
| 5 | 0 | $T_{5,0}$ |
| | 5 | $T_{5,5}$ |
| | 10 | $T_{5,10}$ |
| | 15 | $T_{5,15}$ |
| | ⋮ | ⋮ |
| 10 | 0 | $T_{10,0}$ |
| | 5 | $T_{10,5}$ |
| | 10 | $T_{10,10}$ |
| | 15 | $T_{10,15}$ |
| | ⋮ | ⋮ |
| 15 | 0 | $T_{15,0}$ |
| | 5 | $T_{15,5}$ |
| | 10 | $T_{15,10}$ |
| | 15 | $T_{15,15}$ |
| | ⋮ | ⋮ |
| ⋮ | ⋮ | ⋮ |

3b

PRIOR ART

PRIOR ART

PRIOR ART

PRIOR ART

WORKING DEVICE USING PARALLEL LINK MECHANISM AND CONTROL METHOD THEREOF

CROSS REFERENCE TO THE RELATED APPLICATION

This application is a continuation application, under 35 U.S.C. § 111(a) of international patent application No. PCT/JP2019/007126, filed Feb. 25, 2019, which claims priority to Japanese patent application No. 2018-031748, filed Feb. 26, 2018, the entire disclosures of all of Which are herein incorporated by reference as a part of this application.

BACKGROUND OF THE INVENTION

Field of the Invention

The present invention relates to a working device using a parallel link mechanism used for equipment that requires a precise and wide working range such as industrial equipment and to a control method thereof.

Description of Related Art

A link actuation device that has a compact configuration and is capable of operating in a precise and wide operating range has been suggested in, for example, Patent Document 1. Such a link actuation device of Patent Document 1 includes: a parallel link mechanism in which a distal-side link hub is coupled to a proximal-side link hub through three or more link mechanisms such that a posture of the distal-side link hub can be changed relative to the proximal-side link hub; and actuators provided to two or more of the three or more link mechanisms and configured to arbitrarily change the posture of the distal-side link hub relative to the proximal-side link hub.

Patent Document 2 discloses a control method for setting acceleration and deceleration times of an actuator in order to precisely position the distal-side link hub even during high-speed operation in the link actuation device as described in Patent Document 1. This control method controls operation of the respective actuators through synchronous control which causes all the actuators to start operating and complete the operation at the same time, and performs posture control for changing a posture of the distal-side link hub to an arbitrary posture. In this way, the synchronous control and posture control are performed with the deceleration time of all the actuators set to approximately one period of a resonance frequency of the link actuation device.

Also, a working device in which a link actuation device as described in Patent Document 1 and a linear motion mechanism are combined has been suggested (for example, Patent Document 3). Patent Document 4 suggests a control method for an assembly in which a link actuation device and a linear motion mechanism are combined as described in Patent Document 3, the control method being intended for attaching an end effector to a distal end of the link actuation device and continuously moving the end effector through a plurality of work points within a work space at which the end effector carries out work.

The control method of Patent Document 4 includes: dividing a course from a start point to an end point through which the end effector moves on a target work surface on which the end effector carries out work, into a plurality of sections at passing points; and calculating a rotation speed of each arm in each section from the time required for the end effector to move through the section, which is determined from a specified target movement speed and a distance of each section, as well as a rotation-angle movement amount of each arm in each section. Using the so calculated value as the rotation speed of each arm in each section, the respective actuators are positioned and controlled so as to continuously rotate in the respective sections without acceleration or deceleration. Thus, the actuators are operated at a substantially constant speed from the start point to the end point through the multiple points divided on the target work surface.

RELATED DOCUMENT

Patent Document

[Patent Document 1] JP Patent No. 5785055
[Patent Document 2] JP Patent No. 5864322
[Patent Document 3] JP Laid-open Patent Publication No. 2015-188945
[Patent Document 4] JP Laid-open Patent Publication No. 2015-155124

The method of setting acceleration and deceleration times of an actuator as described in Patent Document 2 involves use of a resonance frequency of a link actuation device in setting. Since the link actuation device as described in Patent Document 1 has varying rigidities depending on the posture of the distal-side link hub and/or the direction of a force applied to the distal-side link hub, the resonance frequency of the link actuation device also varies. Therefore, the method of setting acceleration and deceleration times of an actuator using a resonance frequency of the link actuation device as described in Patent Document 2 cannot achieve precise positioning at high speed because the acceleration and deceleration times become inappropriate in a target position in which the rigidity is different from that in a predetermined posture (e.g., origin posture), causing vibration to occur.

In an assembly in which a link actuation device and a linear motion mechanism are combined as described in Patent Document 3, the link actuation device and the linear motion mechanism may sometimes synchronously operate while an end effector attached to a distal end as described in Patent Document 4 is continuously moved through a plurality of target positions within a work space in which the end effector carries out work. Motion of the link actuation device is controlled as a trapezoidal motion, instead of an S-curve motion. However, since the point-to-point operation of the link actuation device aims high-speed operation and thus has short acceleration and deceleration times, its actual operation is substantially the same in an S-curve motion and a trapezoidal motion. Therefore, the S-curve motion can be approximated by the trapezoidal motion, and acceleration and deceleration speeds can be assumed constant.

Thus, when the link actuation device and the linear motion mechanism synchronously operate, it is necessary to set the acceleration and deceleration times of the linear motion mechanism equal to those of the link actuation device. For this reason, if the acceleration and deceleration times of the actuator of the linear motion mechanism are set on the basis of a resonance frequency of the link actuation device as described in Patent Document 2, the linear motion mechanism may accelerate and decelerate at an increased speed and may thus be caused to vibrate, making it impossible to achieve precise positioning.

The above problem of Patent Document 2 will be described with reference to FIG. 17 to FIG. 25 as an example.

A link actuation device 7 shown in FIG. 17 includes a parallel link mechanism 10 in which a proximal-side link hub 12 is coupled to a distal-side link hub 13 through three link mechanisms 14 such that a posture of the distal-side link hub 13 can be changed relative to the proximal-side link hub 12. Each of the link mechanism 14 includes: a proximal-side end link member 15; a distal-side end link member 16; and an intermediate link member 17, and forms a quadric-chain link mechanism having four revolute pairs. Each of the proximal-side and distal-side end link members 15, 16 has an L shape. The proximal-side end link member 15 has one end rotatably coupled to the proximal-side link hub 12, and the distal-side end link member 16 has one end rotatably coupled to the distal-side link hub 13. The intermediate link member 17 has opposite ends rotatably coupled to the other ends of the proximal-side and distal-side end link members 15, 16.

The link actuation device 7 has a posture defined by a bend angle $\theta$ and a turn angle $\varphi$ as shown in FIG. 20. The bend angle $\theta$ is a vertical angle at which the center axis QB of the distal-side link hub 13 is tilted with respect to the center axis QA of the proximal-side link hub 12. The turn angle $\varphi$ is a horizontal angle at which the center axis QB of the distal-side link hub 13 is tilted with respect to the center axis QA of the proximal-side link hub 12.

FIG. 17 shows an origin posture of the link actuation device. The origin posture refers to a posture in which the center axis QA of the proximal-side link hub 12 coincides with the center axis QB of the distal-side link hub 13. That is, the link actuation device 7 has a posture in which the bend angle $\theta$ is 0°. As long as the bend angle $\theta$ is 0°, the posture is the same (origin posture) regardless of the value of the turn angle $\varphi$. FIG. 18 is a plan view of the origin posture shown in FIG. 17. FIG. 19 shows the rigidity of the link actuation device 7 in force application directions $\theta 0\varphi 0$-A to $\theta 0\varphi 0$-H, where forces are applied to the distal-side link hub in 8 directions (force application directions: $\theta 0\varphi 0$-A to $\theta 0\varphi 0$-H) from its outer periphery on a plane perpendicular to the center axis to the center, as shown in FIG. 18. As shown in FIG. 19, there is little difference in the rigidities against the forces applied from the respective circumferential directions when the device assumes the origin posture.

FIG. 20 shows a bend angle $\theta$ (=$\theta x$) and a turn angle $\varphi$ (=$\varphi y$) in an arbitrary posture. The bend angle $\theta$ and the turn angle $\varphi$ are two parameters that determine the posture of the link actuation device 7. FIG. 21 shows force application directions $\theta x\varphi y$-A to $\theta x\varphi y$-H in which forces are applied to the distal link hub 13 from its outer periphery on a plane perpendicular to the center axis to the center in an arbitrary posture (bend angle $\theta$=$\theta x$; turn angle $\varphi$=$\varphi y$) in the same manner as FIG. 18.

FIG. 21 shows the rigidity of the link actuation device 7 in different force application directions $\theta x\varphi 0$-A to $\theta x\varphi 0$-H in an arbitrary posture (bend angle $\theta x$=$\theta 0$ to $\theta 2$; turn angle $\varphi y$=$\varphi 0$). The force application directions are plotted on the horizontal axis, and the rigidities of the link actuation device 7 in the respective force application directions are plotted on the vertical axis. That is, FIG. 21 shows the rigidity of the link actuation device 7 against forces applied from 8 directions, namely, the force application directions $\theta x\varphi 0$-A to $\theta x\varphi 0$-H, in different postures in which the turn angle $\varphi$ is fixed at $\varphi y$=$\varphi 0$, and the bend angle $\theta$ is set to $\theta x$=$\theta 0$ to $\theta 2$ ($\theta 0$<$\theta 1$<$\theta 2$), As evident from FIG. 22, as the bend angle $\theta$ is made larger, the link actuation device has a greater variation in rigidity among the different force application directions.

As used herein, the expression "rigidity of the link actuation device 7 in force application directions" means the same as "rigidity of the link actuation device 7 in directions of acceleration applied when the distal-side link hub 13 starts operating and completes the operation." The expression "rigidity of the link actuation device 7 in directions of acceleration applied when the distal-side link hub 13 starts operating and completes the operation" means the same as "rigidity of the link actuation device 7 in directions of movement of the distal-side link hub 13." Therefore, it can be seen from FIG. 22 that as the bend angle $\theta$ is made larger, the link actuation device 7 has a greater variation in rigidity among the directions of movement of the distal-side link hub.

FIG. 23 shows, in the same manner as FIG. 22, the rigidity of the link actuation device 7 in different force application directions $\theta x\varphi 1$-A to $\theta x\varphi 1$-H in an arbitrary posture (bend angle $\theta x$=$\theta 0$ to $\theta 2$; turn angle $\varphi y$=$\varphi 1$). That is, FIG. 23 shows the rigidity of the link actuation device 7 against forces applied from 8 directions, namely, the force application directions $\theta x\varphi 1$-A to $\theta x\varphi 1$-H, in different postures in which the turn angle $\varphi$ is fixed at $\varphi y$=$\varphi 1$, and the bend angle $\theta$ is set to $\theta x$=$\theta 0$ to $\theta 2$ ($\theta 0$<$\theta 1$<$\theta 2$). In FIG. 23, although the maximum rigidity is observed in a different force application direction from that of FIG. 22, it can be seen that as the bend angle $\theta$ is made larger, the link actuation device has a greater variation in rigidity among the different force application directions in the same manner as FIG. 22. That is, as the bend angle $\theta$ is made larger, the link actuation device 7 has a greater variation in rigidity among the directions of movement of the distal-side link hub.

FIG. 24 also shows, in the same manner as FIG. 22, the rigidity of the link actuation device 7 in different force application directions $\theta x\varphi 2$-A to $\theta x\varphi 2$-H in an arbitrary posture (bend angle $\theta x$=$\theta 0$ to $\theta 2$; turn angle $\varphi y$=$\varphi 2$). That is, FIG. 24 shows the rigidity of the link actuation device 7 against forces applied from 8 directions, namely, the force application directions $\theta x\varphi 2$-A to $\theta x\varphi 2$-H, in different postures in which the turn angle $\varphi$ is fixed at $\varphi y$=$\varphi 2$, and the bend angle $\theta$ is set to $\theta x$=$\theta 0$ to $\theta 2$ ($\theta 0$<$\theta 1$<$\theta 2$). In FIG. 24, although the maximum rigidity is observed in a different force application direction from those in FIG. 22 and FIG. 23, it can be seen that as the bend angle $\theta$ is made larger, the link actuation device has a greater variation in rigidity among the different force application directions in the same manner as FIG. 22 and FIG. 23. That is, as the bend angle $\theta$'is made larger, the link actuation device 7 has a greater variation in rigidity among the directions of movement of the distal-side link hub 13.

FIG. 25 shows the rigidity of the link actuation device 7 in different force application directions $\theta 2\varphi y$-A to $\theta 2\varphi y$-H in an arbitrary posture (bend angle $\theta x$=$\theta 2$; turn angle $\varphi y$=$\varphi 0$ to $\varphi 2$). That is, FIG. 25 shows, unlike FIG. 22 to FIG. 24, the rigidity of the link actuation device 7 against forces applied from 8 directions, namely, force application directions $\theta 2\varphi y$-A to $\theta 2\varphi y$-H, in different postures in which the bend angle $\theta$ is fixed at $\theta x$=$\theta 2$, and the turn angle $\varphi$ is set to $\varphi y$=$\varphi 0$ to $\varphi 2$ ($\varphi 0$<$\varphi 1$<$\varphi 2$). In FIG. 25, where the turn angle $\varphi$ is different, even if the bend angle $\theta$ is the same, the link actuation device 7 has different rigidities in the respective force application directions. This means that the link actuation device 7 has varying rigidities among the directions of movement of the distal-side link hub according to the turn angle $\varphi$. Therefore, as can be seen from FIG. 22 to FIG. 25, the rigidities of the link actuation device 7 vary depending on the posture of the distal-side link hub and/or the direction of a force applied to the distal-side link hub (directions of movement of the distal-side link hub), causing the resonance frequency of the link actuation device 7 to vary.

Therefore, in the method of setting acceleration and deceleration times of an actuator using a resonance frequency of the link actuation device 7 as described in Patent Document 2, the acceleration and deceleration times become inappropriate in a target position in which the rigidity is different from that in a predetermined posture (e.g., origin posture). This causes vibration to occur, making it impossible to achieve precise positioning at high speed.

SUMMARY OF THE INVENTION

An object of the present invention is to provide a working device using a parallel link mechanism, which is capable of suitably setting acceleration and deceleration times so as to suppress vibration in a condition where the rigidity is different from that in a predetermined posture.

Another object of the present invention is to provide a working device using a parallel link mechanism, which is capable of suitably setting acceleration and deceleration times in each operation mode in a working device in which a link actuation device and a single- or multi-axis combined-side actuator are combined, so as to suppress vibration and enable precise positioning at high speed.

Yet another object of the present invention is to provide a control method for easily setting acceleration and deceleration times to appropriate values for each target position in a working device using a parallel link mechanism of the present invention.

A working device according to the present invention will be described by use of reference numerals used in embodiments. The working device 1 using a first parallel link mechanism 10 according to the present invention includes: a link actuation device 7 including:

a proximal-side link hub 12; a distal-side link hub 13; three or more link mechanisms 14 each coupling the distal-side link hub 13 to the proximal-side link hub 12 such that a posture of the distal-side link hub 13 can be changed relative to the proximal-side link hub 12; and posture control actuators 11 (11-1, 11-2, 11-3) provided to two or more link mechanisms 14 of the three or more link mechanisms 14 and configured to change the posture of the distal-side link hub 13 relative to the proximal-side link hub 12;

each of the link mechanisms 14 including: a proximal-side end link member having one end rotatably coupled to the proximal-side link hub 12; a distal-side end link member having one end rotatably coupled to the distal-side link hub 13; and an intermediate link member having opposite ends rotatably coupled to the other ends of the proximal-side and distal-side end link members; and a control device 2 configured to control each of the actuators 11 (11-1, 11-2, 11-3) to change the posture of the distal-side link hub 13 relative to the proximal-side link hub 12 such that a position P determined on the basis of the distal-side link hub 13 is changed from a current position to a target position, wherein the control device 2 includes:
a storage unit 3 configured to store a plurality of the target positions P (P1, P2, P3, . . . );
a calculation unit 4 configured to sequentially read out the respective target positions P (P1, P2, P3, . . . ) stored in the storage unit 3 to calculate movement amounts and movement speeds of the respective actuators 11 (11-1, 11-2, 11-3) between the target positions (P1, P2, P3, . . . ); and a control unit 5 configured to operate the respective actuators 11 (11-1, 11-2, 11-3) by the movement amounts and at the movement speeds of the respective actuators 11 (11-1, 11-2, 11-3) calculated by the calculation unit 4, and the control unit 5 is capable of changing acceleration and deceleration times of the actuators 11 (11-1, 11-2, 11-3) for each of the target positions P (P1, P2, P3, . . . ).

It should be noted that the "position determined on the basis of the distal-side link hub 13" may be a position univocally determined on the basis of the position and the posture of the distal-side link hub 13. For example, the position may be a work point (a position denoted by "P" indicating a target position) of an end effector 6 that is attached to the distal-side link hub 13 and carries out work on an object (workpiece), or more specifically, a distal end of the end effector 6. Therefore, where the "position" is defined as a target position P by, e.g., a coordinate position, the posture of the distal-side link hub 13 changes as the target position P changes. In this specification and the attached drawings, the work point corresponds to a position denoted by "P" indicating a target position. The "acceleration and deceleration times" refer to an acceleration time and a deceleration time.

In cases where a resonance frequency of the link actuation device 7 is used in setting the acceleration and deceleration times of the actuators 11 (11-1, 11-2, 11-3) for operating the working device 1, use of a resonance frequency in a predetermined posture (e.g., origin posture) may cause the rigidity of the link actuation device 7 (rigidities of the parallel link mechanism 10) to be varied depending on the posture and the movement direction, causing vibration to occur.

In a first working device of the present invention, however, the acceleration and deceleration times of each actuator 11 (11-1, 11-2, 11-3) can be changed for each target position P when the link actuation device 7 is operated from one posture (one target position P) to a next posture (next target position P). Thus, the acceleration and deceleration times can be set for each target position using a resonance frequency according to the posture of the distal-side link hub 13 in the target position P and the movement direction of the distal-side link hub. This makes it possible to suppress vibration during high-speed positioning in a target position P in which the rigidity is different from that in a predetermined posture.

In the first working device of the present invention, the storage unit 3 may be configured to store a correspondence table 3a that specifies the acceleration and deceleration times for each target position P, and the control unit 6 may be configured to operate the respective actuators 11 (11-1, 11-2, 11-3) with the acceleration and deceleration times that are read out from the correspondence table 3a for each target position P. By use of the correspondence table (i.e., correlation table) 3a that indicates a correlation between the respective target positions P and the acceleration and deceleration times, it is possible to set the acceleration and deceleration times for each target position P according to the posture and the movement direction of the distal-side link hub 13. Therefore, it is possible to suppress vibration during high-speed positioning by simple control in a target position in which the rigidity is different from that in a predetermined posture. In such a case, the acceleration and deceleration times correspond to an acceleration time and a deceleration time when a point-to-point operation is performed in a trapezoidal motion.

In the first working device of the present invention, the storage unit 3 may be configured to store a correspondence table 3b that specifies the acceleration and deceleration times for each predetermined posture defined by dividing an operable range of the distal-side link hub 13, and the control unit 5 may be configured to use the acceleration and deceleration times in the correspondence table 3b to calculate the acceleration and deceleration times for each target position for use in control. Although the posture of the link actuation device 7 is defined by a bend angle θ and a turn angle φ, "each predetermined posture" may be divided on the basis of only the bend angle θ or on the basis of both of the bend angle θ and the turn angle φ. The time required to set the acceleration and deceleration times can also be reduced by using the acceleration and deceleration times for each predetermined posture defined by dividing the operable range of the distal-side link hub 13, and vibration during high-speed positioning can be suppressed by simple control in a target position P in which the rigidity is different from that in a predetermined posture.

In such a case, the control unit 5 may be configured to calculate the acceleration and deceleration times of each target position by linear approximation from the acceleration and deceleration times in the correspondence table 3b. Use of linear approximation makes it easy to calculate the acceleration and deceleration times for each target position P.

A second working device 1 using a parallel link mechanism according to the present invention includes:

a link actuation device 7 including:

a proximal-side link hub 12; a distal-side link hub 13; three or more link mechanisms 14 each coupling the distal-side link hub 13 to the proximal-side link hub 12 such that a posture of the distal-side link hub 13 can be changed relative to the proximal-side link hub 12; and posture control actuators 11 (11-1, 11-2, 11-3) provided to two or more link mechanisms 14 of the three or more link mechanisms 14 and configured to change the posture of the distal-side link hub 13 relative to the proximal-side link hub 12;

each of the link mechanisms 14 including: a proximal-side end link member having one end rotatably coupled to the proximal-side link hub 12; a distal-side end link member having one end rotatably coupled to the distal-side link hub 13; and an intermediate link member having opposite ends rotatably coupled to the other ends of the proximal-side and distal-side end link members; and an end effector 6 attached to the distal-side link hub 13;

a single-axis or multi-axis combined-side actuator 71-73, 85-87, 95-98 combined with the link actuation device 7; and a control device 2 configured to control the posture control actuators 11 (11-1, 11-2, 11-3) and the combined-side actuator 71-73, 85-87, 95-98, wherein the control device 2 includes:

a storage unit 3 configured to store a plurality of target positions P that are coordinates of respective work points within a work space at which the end effector 6 carries out work;

a calculation unit 4 configured to sequentially read out the respective target positions P stored in the storage unit 3 to calculate movement amounts and movement speeds of the respective actuators 11 (11-1, 11-2, 11-3), 71-73, 85-87, 95-98 between the target positions P; and a control unit 5 configured to operate the respective actuators 11 (11-1, 11-2, 11-3), 71-73, 85-87, 95-98 by the movement amounts and at the movement speeds of the respective actuators 11 (11-1, 11-2, 11-3), 71-73, 85-87, 95-98 calculated by the calculation unit 4, and the control unit 5 is capable of changing the acceleration and deceleration times of each of the actuators 11 (11-1, 11-2, 11-3), 71-73, 85-87, 95-98 to be moved.

Thus, the control unit 5 is capable of changing the acceleration and deceleration times of each of the actuators 11 (11-1, 11-2, 11-3), 71-73, 85-87, 95-98 to be moved. Therefore, in an assembly in which the link actuation device 7 and a single-axis or multi-axis actuator (for example, actuators 71 to 73 each including a linear motion mechanism) are combined, it is possible to appropriately set the acceleration and deceleration times in accordance with conditions in cases where only the link actuation device 7 operates, or where the single- or multi-axis actuator 71-73 other than the link actuation device 7 operates, or where the link actuation device 7 and the single- or multi-axis actuator 71-73 synchronously operate. Therefore, it is possible to suppress the vibration and enable precise positioning at high speed.

In the second working device 1 of the present invention, where the combined-side actuator 71-73, 85-87, 95-98 does not operate and only the link actuation device 7 operates, the control unit 5 may be capable of changing the acceleration and deceleration times of each of the actuators 11 (11-1, 11-2, 11-3), 71-73, 85-87, 95-98 for each target position P. Where only the link actuation device 7 operates, the acceleration and deceleration times of the link actuation device 7 can be changed in accordance with the posture of the distal-side link hub 13 and/or the movement direction of the distal-side link hub 13, and as a result, vibration can be suppressed in a target position P in which the rigidity is different from that in a predetermined posture (e.g., origin posture) so as to enable precise positioning at high speed.

In the second invention, where the link actuation device 7 and the combined-side actuator 71-73, 85-87, 95-98 synchronously operate, the control device 2 may be configured to operate each combined-side actuator 71-73, 85-87, 95-98 with integer multiples of the acceleration and deceleration times of the posture control actuators 11 (11-1, 11-2, 11-3) used where only the link actuation device 7 operates.

Where the single- or multi-axis actuator 71-73, 85-87, 95-98 other than the link actuation device 7 operates, acceleration and deceleration times can be set in accordance with load of the actuator 71-73, 85-87, 95-98 to be operated, so as to suppress vibration and enable precise positioning at high speed. Where they synchronously operate, setting the acceleration and deceleration times to the integer multiples of the acceleration and deceleration times used where only the link actuation device 7 operates can provide an effect that the acceleration and deceleration times of the link actuation device 7 can be set to an integer multiple of its resonance frequency so as to suppress vibration, whereas the sufficient acceleration and deceleration times can be secured for the single- or multi-axis actuator other than the link actuation device 7 so as to suppress vibration.

Use of the integer multiple of the resonance frequency can provide the same effect as that obtained by setting the acceleration and deceleration times to one period of the resonance frequency. Excessively long acceleration and deceleration times may decrease an average speed of a series of operations. Such decrease in the average speed of a series of operation, however, can be prevented by setting the acceleration and deceleration times to a period of an integer-multiple of a smallest resonance frequency that is equal to or greater than the acceleration and deceleration times used where only the actuator other than the link actuation device operates.

Where the acceleration and deceleration times of each of the actuators 11 (11-1, 11-2, 11-3), 71-73, 85-87, 95-98 can be changed for each target position P, the storage unit 3 may be configured to store a correspondence table 3a that specifies the acceleration and deceleration times for each target position P, and the control unit 5 may be configured to operate the respective actuators 11 (11-1, 11-2, 11-3), 71-73, 85-87, 95-98 with the acceleration and deceleration times that are read out from the correspondence table 3a for each target position P. Similarly to the first working device of the present invention, use of the correspondence table 3a that indicates a correlation between each target position P and the acceleration and deceleration times makes it possible to set acceleration and deceleration times for each target position P according to the posture and movement direction of the distal-side link hub 13. Therefore, it is possible to suppress vibration during high-speed positioning by simple control in a target position P in Which the rigidity is different from that in a predetermined posture.

Where the acceleration and deceleration times of each of the actuators 11 (11-1, 11-2, 11-3), 71-73, 85-87, 95-98 can be changed for each target position P, the storage unit 3 may be configured to store a correspondence table 3b that the specifies acceleration and deceleration times for each predetermined posture defined by dividing an operable range of the distal-side link hub 13, and the control unit 5 may be configured to use the acceleration and deceleration times in the correspondence table 3b to calculate the acceleration and deceleration times for each target position P for use in control. The time required to set the acceleration and deceleration times can also be reduced by using the acceleration and deceleration times for each predetermined posture defined by dividing the operable range of the distal-side link hub 13. Thus, it is possible to suppress vibration during high-speed positioning by simple control in a target position in which the rigidity is different from that in a predetermined posture.

In such a case, the control unit 5 may be configured to calculate the acceleration and deceleration times for each target position by linear approximation from the acceleration and deceleration times for each predetermined posture. Use of linear approximation makes it easy to calculate the acceleration and deceleration times for each target position P.

Each of the first and second working devices 1 may include an input unit 8 configured to allow an operator to change the acceleration and deceleration times for each target position P in the storage unit 3 by manual input, and the control unit 5 may be configured to operate each of the actuators 11 (11-1, 11-2, 11-3), 71-73, 85-87, 95-98 with the acceleration and deceleration times read out from the storage unit for each target position. By allowing an operator to change the acceleration and deceleration times by manual input, it is possible to suppress vibration during high-speed positioning by simple control in a target position P in Which the rigidity is different from that in a predetermined posture.

Each of the first and second working devices 1 may include: a vibration detector 100 configured to detect vibration of the distal-side link hub 13; and a learning unit 99 in the control device 5, in which case: the learning unit 99 may be configured to learn relevance among postures of the distal-side link hub 13 and directions of movement of the distal-side link hub 13, the vibration of the distal-side link hub 13, the acceleration and deceleration times and to use learned data to set the acceleration and deceleration times in the storage unit 3; and the control unit 5 may be configured to use the acceleration and deceleration times set in the storage unit 3 to change the acceleration and deceleration times of each of the actuators 11 (11-1, 11-2, 11-3), 71-73, 85-87, 95-98 for each target position P.

The learning unit 99 may be, for example, artificial intelligence and may be configured to mechanically determine data stored in the storage unit 3 and to use a determination result to automatically set optimal acceleration and deceleration times in the storage unit 3 according to a change in the size and/or weight of a loaded workpiece. Any method may be used for learning. By providing such a learning function, the acceleration and deceleration times are automatically set for each target position P, even where the size and/or weight of the loaded workpiece W is/are changed, and therefore, vibration during high-speed positioning can easily be suppressed in a target position P in which the rigidity is different from that in a predetermined posture.

In each of the first and second working devices 1, the acceleration and deceleration times for each target position P in the correspondence table 3a may be acceleration and deceleration times of each of the actuators 11 (11-1, 11-2, 11-3), 71 which are calculated on the basis of rigidities of the parallel link mechanism 10 in at least two postures in the current position and the target position. This makes it easy to set appropriate acceleration and deceleration times for each target position P.

In this case, the acceleration and deceleration times for each target position P in the correspondence table 3a may be the acceleration and deceleration times for each target position P which are calculated by linear approximation of change in rigidities between two positions of a change start position, at which the posture starts to be sequentially changed to the respective target positions P, and a final target position. Use of linear approximation makes it easy to set the acceleration and deceleration times for each target position.

In a control method of the present invention, the acceleration and deceleration times for each target position P in the correspondence table 3a in the working device of the present invention may be acceleration and deceleration times of each actuator which are calculated on the basis of rigidities of the parallel link mechanism in at least two postures in the current position and the target position. Thus, by setting the acceleration and deceleration times of each actuator on the basis of the rigidities of the parallel link mechanism in at least two postures in the current position and the target position, it is possible to easily set the acceleration and deceleration times to appropriate values for each target position.

In the control method of the present invention, the acceleration and deceleration times for each target posture in the correspondence table may be the acceleration and deceleration times for each target position which are calculated by linear approximation of change in rigidities between two postures including a posture at a change start position, at which the posture starts to be sequentially changed to respective target postures, and a posture at a final target position. In this case, it is also possible to easily set the acceleration and deceleration times to appropriate values for each target position.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views:

FIG. 9C shows yet another example of the correspondence table for the working device;

DESCRIPTION OF THE EMBODIMENTS

Figure 1:
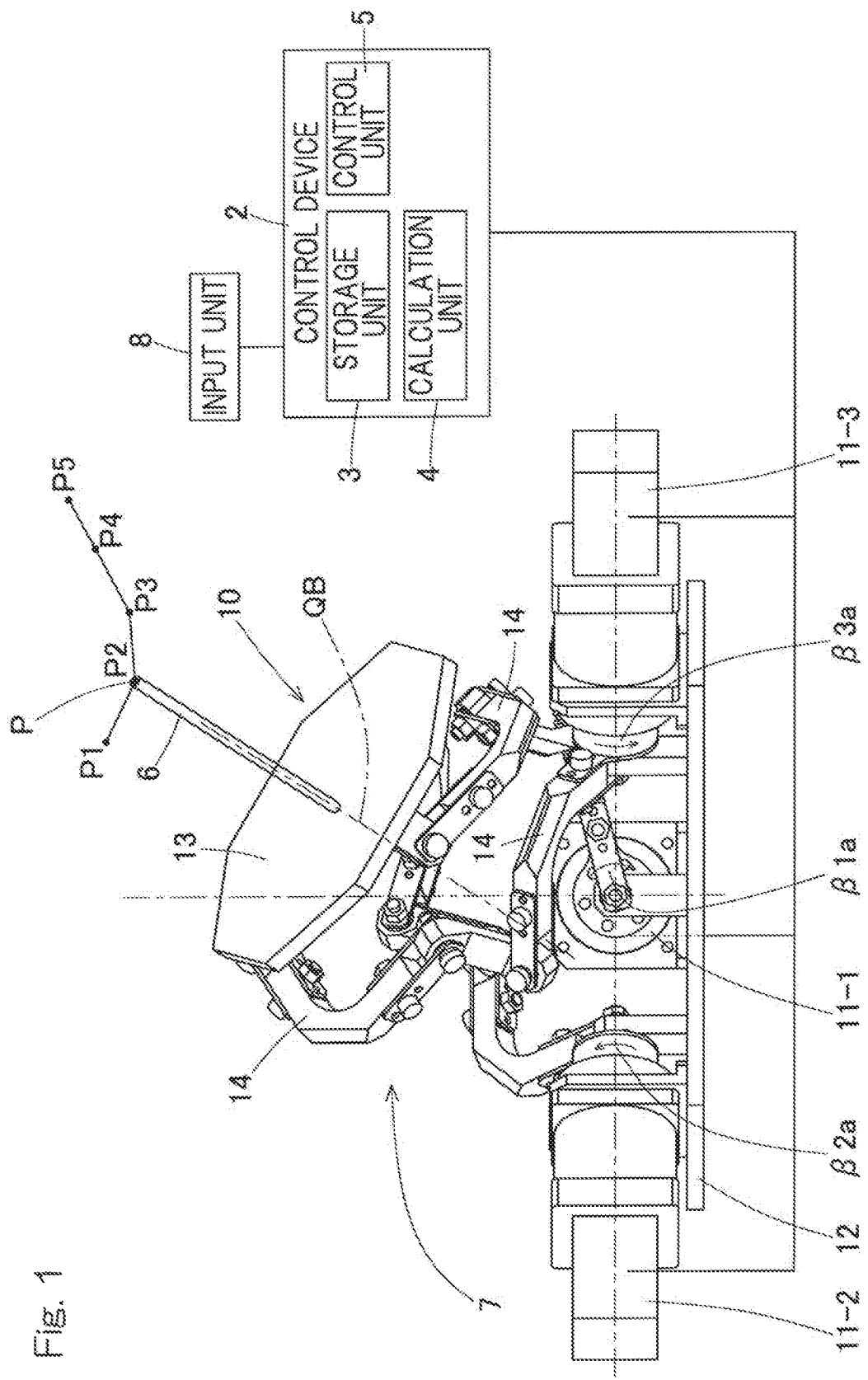
FIG. 1 shows a perspective view of a working device using a parallel link mechanism according to a first embodiment of the present invention in combination with a block diagram of a control device.

Embodiments of the present invention will be described with reference to the drawings.

First Embodiment

FIG. 1 to FIG. 8 show a first embodiment of the present invention. The working device 1 using a parallel link mechanism includes: a link actuation device 7 including the parallel link mechanism 10 and posture control actuators 11 (11-1, 11-2, 11-3); an end effector 6; and a control device 2.

Figure 2:
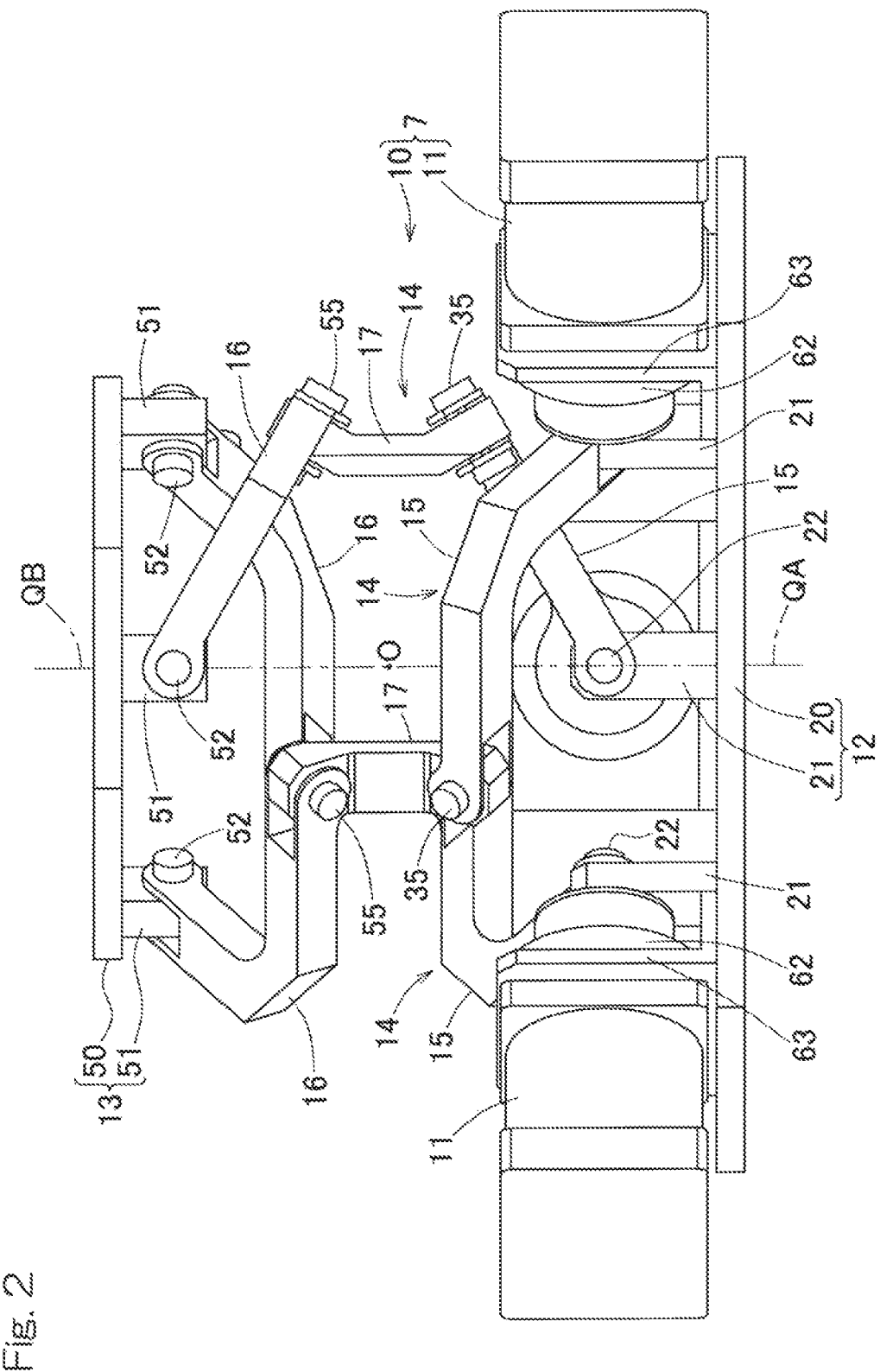
FIG. 2 is a front view of the link actuation device of the working device.
Figure 3:
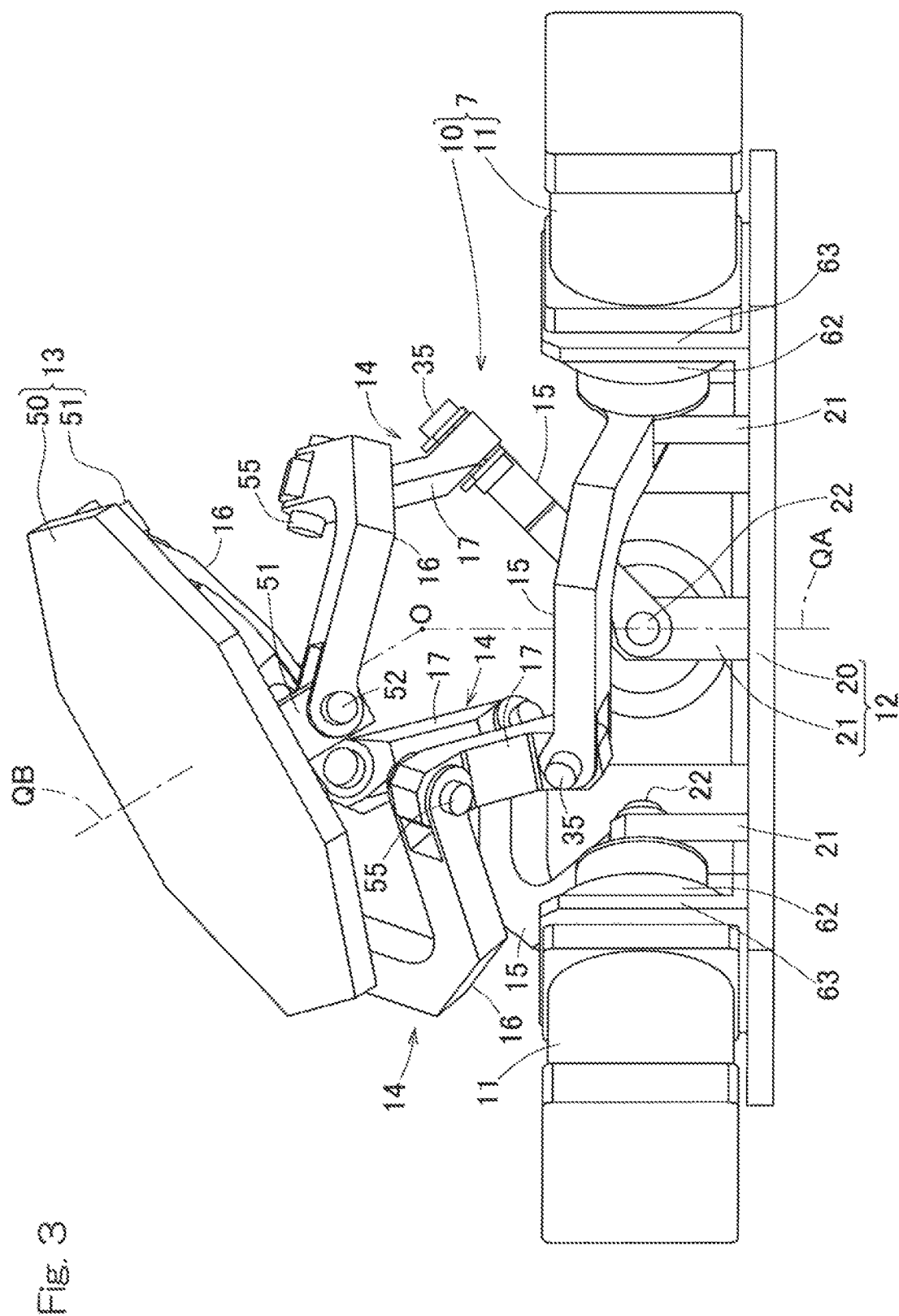
FIG. 3 illustrates operation of the link actuation device.

The link actuation device 7 will be described. As shown in FIG. 2 and FIG. 3, the parallel link mechanism 10 of the link actuation device 7 includes a proximal-side link hub 12, a distal-side link hub 13, and three link mechanisms 14 each coupling the distal-side link hub 13 to the proximal-side link hub 12 such that a posture of the distal-side link hub 13 can be changed relative to the proximal-side link hub 12. There may be four or more the link mechanisms 14.

Figure 4:
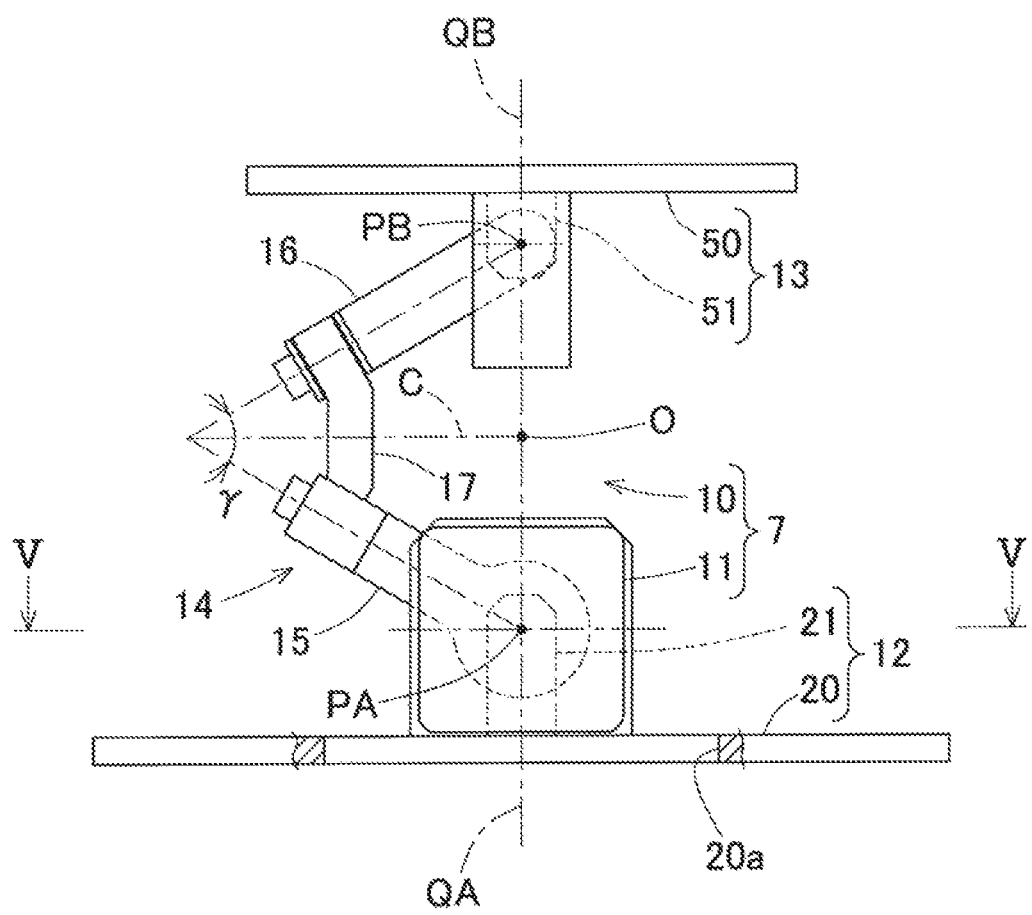
FIG. 4 is a front view showing a part of the link actuation device.

FIG. 4 shows one of the link mechanisms 14. As shown in FIG. 4, each of the link mechanisms 14 includes: a proximal-side end link member 15; a distal-side end link member 16; and an intermediate link member 17, and forms a quadric-chain link mechanism having four revolute pairs. Each of the proximal-side and distal-side end link members 15, 16 has an L shape. The proximal-side end link member 15 has one end rotatably coupled to the proximal-side link hub 12, and the distal-side end link member 16 has one end rotatably coupled to the distal-side link hub 13. The intermediate link member 17 has opposite ends rotatably coupled to the other ends of the proximal-side and distal-side end link members 15, 16.

Figure 5:
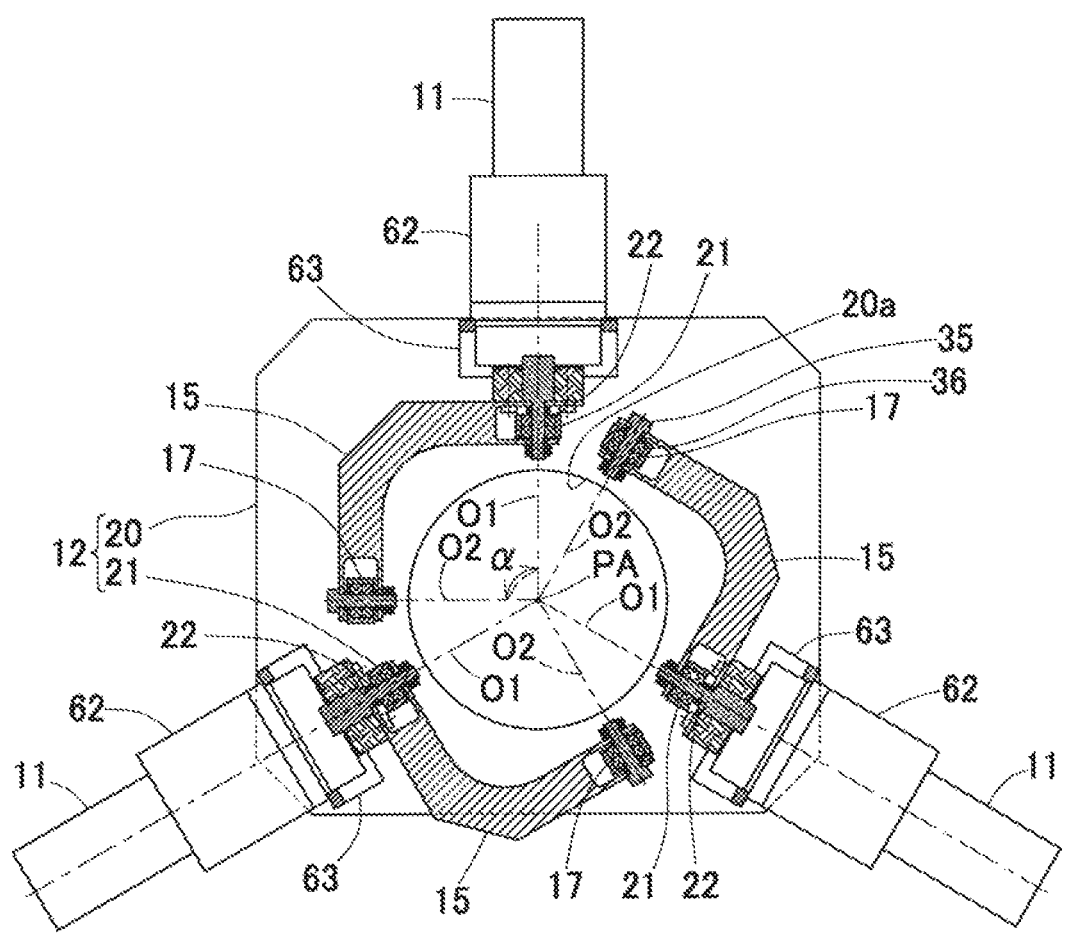
FIG. 5 is a cross-sectional view along line V-V shown in FIG. 4.

The parallel link mechanism 10 has a structure in which two spherical link mechanisms are combined. In this structure, the center axis of each revolute pair of the proximal-side link hub 12 and the proximal-side end link member 15 intersects with the center axis of each revolute pair of the proximal-side end link member 15 and the intermediate link member 17 at the center PA of a proximal-side spherical link (FIG. 5). Similarly, the center axis of each revolute pair of the distal-side link hub 13 and the distal-side end link member 16 intersects with the center axis of each revolute pair of the distal-side end link member 16 and the intermediate link member 17 at the center PB of a distal-side spherical link (FIG. 5).

On both of the proximal side and distal side, there is the same distance from each revolute pair of the link hub 12, 13 and the end link member 15, 16 to the center PA, PB of each spherical link, and there is also the same distance from each revolute pair of the end link member 15, 16 and the intermediate link member 17 to the center PA, PB of each spherical link. The center axis of the revolute pair of the proximal-side end link member 15 and the intermediate link member 17 may be tilted at a certain intersection angle γ1 with respect to or be in parallel with the center axis of the revolute pair of the distal-side end link member 16 and the intermediate link member 17.

FIG. 5 is a cross-sectional view along line V-V shown in FIG. 4. FIG. 5 shows a relationship among the center axis O1 of each revolute pair of the proximal-side link hub 12 and the proximal-side end link member 15, the center axis O2 of each revolute pair of the intermediate link member 17 and the proximal-side end link member 15, and the center PA of the proximal-side spherical link. That is, the point at which the center axis O1 and the center axis O2 intersect corresponds to the center PA of the spherical link. Although the center axis O1 of each revolute pair of the link hub 12 (13) and the end link member 15 (16) and the center axis O2 of each revolute pair of the end link member 15 (16) and the intermediate link member 17 form an angle α of 90° in the illustrated example, the angle α may not necessarily be 90°.

Figure 6:
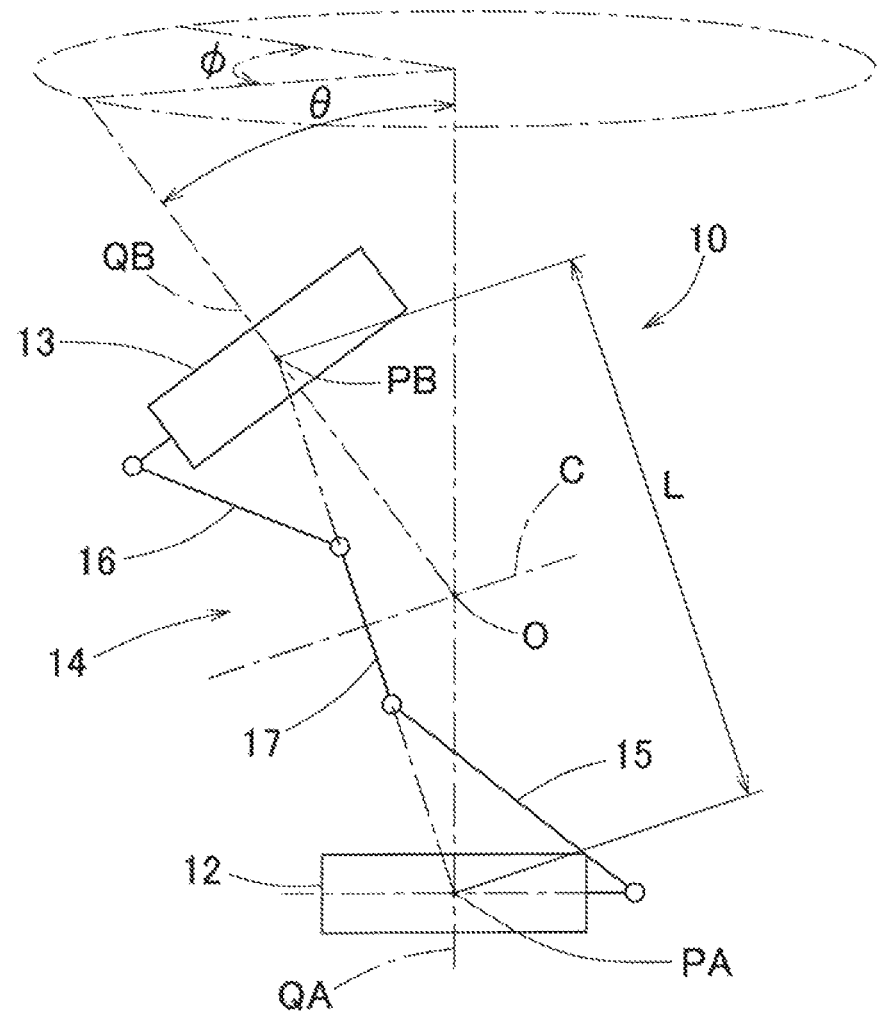
FIG. 6 is a model diagram showing the link actuation device with straight lines.

The three link mechanisms 14 have geometrically the same shape in any posture, The expression "geometrically the same shape" means that, as shown in FIG. 6, a geometric model that represents the respective link members 15, 16, 17 with straight lines, that is, a model that is represented by the respective revolute pairs and lines connecting these revolute pairs, has such a shape that a proximal-side part and a distal-side part with respect to a central part of the intermediate link member 17 are symmetrical to each other. FIG. 6 illustrates one link mechanism 14 with straight lines. The parallel link mechanism 10 of this embodiment is of a rotationally symmetric type. That is, the positional relationship between the proximal-side part formed by the proximal-side link hub 12 and the proximal-side end link member 15 and the distal-side part formed by the distal-side link hub 13 and the distal-side end link member 16 is rotationally symmetric with respect to a center line C of the intermediate link member 17. The central parts of the respective intermediate link members 17 are located on a common orbital circle.

The proximal-side link hub 12, the distal-side link hub 13, and the three link mechanisms 14 cooperate together to form a mechanism having two degrees of freedom that allows the distal-side link hub 13 to rotatably move about two orthogonal axes relative to the proximal-side link hub 12. In other words, this mechanism is operable to change the posture of the distal-side link hub 13 relative to the proximal-side link hub 12 in two degrees of freedom of rotation. This mechanism having two degrees of freedom makes it possible to achieve a configuration that is compact and provides a wide operating range for the distal-side link hub 13 relative to the proximal-side link hub 12.

For example, the line that passes through the center PA of the proximal-side spherical link and orthogonally intersects with the center axis O1 (FIG. 5) of each revolute pair of the proximal-side link hub 12 and the proximal-side end link member 15 is referred to as a center axis QA of the proximal-side link hub 12. Similarly, the line that passes through the center PB of the distal-side spherical link and orthogonally intersects with the center axis O1 (FIG. 5) of each revolute pair of the distal-side link hub 13 and the distal-side end link member 16 is referred to as a center axis QB of the distal-side link hub 13.

In that case, a bend angle θ between the center axis QA of the proximal-side link hub 12 and the center axis QB of the distal-side link hub 13 may have a maximum value of about ±90°. A turn angle φ of the distal-side link hub 13 with respect to the proximal-side link hub 12 may be set in a range from 0° to 360°. The bend angle θ is a vertical angle at which the center axis QB of the distal-side link hub 13 is tilted with respect to the center axis QA of the proximal-side link hub 12. The turn angle φ is a horizontal angle at which the center axis QB of the distal-side link hub 13 is tilted with respect to the center axis QA of the proximal-side link hub 12.

The posture of the distal-side link hub 13 relative to the proximal-side link hub 12 is changed in such a manner that a rotation center is located at an intersection O of the center axis QA of the proximal-side link hub 12 and the center axis QB of the distal-side link hub 13. In a state at an origin position where the center axis QA of the proximal-side link hub 12 and the center axis QB of the distal-side link hub 13 are on the same line (FIG. 2), the distal-side link hub 13 faces directly downward. FIG. 1 and FIG. 3 show a state where the center axis QB of the distal-side link hub 13 makes a certain operation angle with respect to the center axis QA of the proximal-side link hub 12. Even where the posture is changed, the distance L between the centers PA, PB of the proximal-side and the distal-side spherical links (FIG. 6) does not change.

Where each of the link mechanisms 14 satisfies the following conditions 1 to 5, the proximal-side part formed by the proximal-side link hub 12 and the proximal-side end link member 15 moves in the same manner as the distal-side part formed by the distal-side link hub 13 and the distal-side end link member 16 because of the geometric symmetry. Therefore, the parallel link mechanism 10 functions as a constant velocity universal joint that makes the same rotation angle on the proximal-side and the distal-side and rotates at a constant velocity, when rotation is transmitted from the proximal side to the distal side.

Condition 1: the center axes O1 of the revolute pairs of the proximal-side link hubs 12 (distal-side link hub 13) and the proximal-side end link members 15 (distal-side end link members 16) of the respective link mechanisms 14 have mutually the same angle and length.

Condition 2: the center axis O1 of the revolute pair of the proximal-side link hub 12 (distal-side link hub 13) and the proximal-side end link member 15 (distal-side end link member 16) intersects with the center axis O2 of the revolute pair of the proximal-side end link member 15 (distal-side end link member 16) and the intermediate link member 17, at the center PA of the proximal-side spherical link (center PB of the distal-side spherical link).

Condition 3: the proximal-side end link member 15 and the distal-side end link member 16 have the same geometric shape.

Condition 4: the proximal-side part and the distal-side part of the intermediate link member 17 have the same geometric shape.

Condition 5: the angular position relationship between the intermediate link member 17 and the proximal-side end link member 15 with respect to a symmetry plane of the intermediate link member 17 is the same as the angular position relationship between the intermediate link member 17 and the distal-side end link member 16.

As shown in FIG. 2, the proximal-side link hub 12 includes a proximal end member 20 and three rotation shaft coupling members 21 integrally provided with the proximal end member 20. The proximal end member 20 has a round through hole 20a (see FIG. 5) in a central part thereof, and the three rotation shaft coupling members 21 are disposed around the through hole 20a at equal intervals in a circumferential direction. The center of the through hole 20a is located on the center axis QA (FIG. 4) of the proximal-side link hub 12. Each rotation shaft coupling member 21 is rotatably coupled to a rotation shaft 22. The axis of the rotation shaft 22 intersects with the center axis QA of the proximal-side link hub 12. The rotation shaft 22 is coupled to one end of the proximal-side end link member 15.

The other end of the proximal-side end link member 15 is coupled to a rotation shaft 35. The rotation shaft 35 is rotatably coupled to one end of the intermediate link member 17. Specifically, as shown in FIG. 5, the rotation shaft 35 are rotatably coupled to one end of the intermediate link member 17 through two bearings 36.

As shown in FIG. 2, the distal-side link hub 13 includes a plate-like distal end member 50 and three rotation shaft coupling members 51 provided to an inner surface of the distal end member 50 at equal intervals in a circumferential direction. The center of the circumference on which the three rotation shaft coupling members 51 are disposed is located on the center axis QB of the distal-side link hub 13. Each rotation shaft coupling member 51 is rotatably coupled to a rotation shaft 52. The axis of the rotation shaft 52 intersects with the center axis QB of the distal-side link hub 13.

The rotation shaft 52 of the distal-side link hub 13 is coupled to one end of the distal-side end link member 16. The other end of the distal-side end link member 16 is coupled to a rotation shaft 55. The rotation shaft 55 is rotatably coupled to the other end of the intermediate link member 17. The rotation shaft 52 of the distal-side link hub 13 and the rotation shaft 55 of the intermediate link member 17 also have the same shape as that of the rotation shaft 35 and are rotatably coupled to the other end of the rotation shaft coupling member 51 and to the other end of the intermediate link member 17, respectively, through two bearings (not illustrated).

The link actuation device 7 includes posture control actuators 11 which are rotary actuators each having a speed reduction mechanism 62, as shown in FIG. 5. The actuators 11 are disposed on a lower surface of the proximal end member 20 of the proximal-side link hub 12 so as to be coaxial with the rotation shafts 22. The posture control actuators 11 and the speed reduction mechanisms 62 are integrally provided, and the speed reduction mechanisms 62 are fixed to the proximal end member 20 by motor fixing members 63. In this example, all of the three link mechanisms 14 are provided with the posture control actuators 11. However, as long as at least two of the three link mechanisms 14 are provided with the posture control actuators 11, the posture of the distal-side link hub 13 relative to the proximal-side link hub 12 can be determined.

In the link actuation device 7, when the respective posture control actuators 11 are rotationally driven, the parallel link mechanism 10 is also operated. Specifically, when the posture control actuators 11 are rotationally driven, the rotation of the actuator 11 is transmitted to the rotation shaft 22 with its speed reduced through the speed reduction mechanism 62. Thus, the angle of the proximal-side end link member 15 relative to the proximal-side link hub 12 is changed, and the posture of the distal-side link hub 13 is changed relative to the proximal-side link hub 12.

End Effector 6

As shown in FIG. 1, the end effector 6 is operable to carry out work on an object (not illustrated) by the work device 1. The end effector 6 may be, for example, an application nozzle, an air nozzle, a welding torch, a camera, a clamping mechanism. In the example shown in FIG. 1, the end effector 6 is a device (for example, an application nozzle) that is mounted to the distal-side link hub 13 so as to protrude along the center axis QB and has a distal end at a work point P (a position denoted by "P" indicating a target position). The work point of the end effector 6 may be separated from the distal end of the end effector 6 in an extension direction of the center axis QB.

Control Device 2

The control device 2 is operable to control the posture control actuators 11 (11-1 to 11-3). The control device 2 may be comprised of a computer, a program executed thereon, and an electronic circuit, etc., and include a storage unit 3, a calculation unit 4, and a control unit 5. An input unit 8 is connected to the control device 2.

The storage unit 3 stores a plurality of target positions Pi (i: 1, 2, 3, . . . ) through which the end effector is sequentially moved. It should be noted that for the sake of simplification of the description, a position may sometimes be simply referred to as "target position P," when a specific target position Pi is not mentioned. The target position P is determined on the basis of the distal-side link hub 13. In this embodiment, the target position P is defined by coordinates of the work point of the end effector 6. Accordingly, the posture of the distal-side link hub 13 changes as the target position P changes. Each of the target positions P in the storage unit 3 may be stored as polar coordinates ($\theta$, $\varphi$) denoted by a bend angle $\theta$ and a turn angle $\varphi$ or as three-dimensional orthogonal coordinates. Where the target positions are stored as three-dimensional orthogonal coordinates, the storage unit stores coordinates (XPi, YPi, ZPi) of the target positions Pi (i=0, 1, 2, 3, . . . ) that are work points within a work space S at which the end effector 6 carries out work.

Correspondence Table 3a

Figures 7, 8:
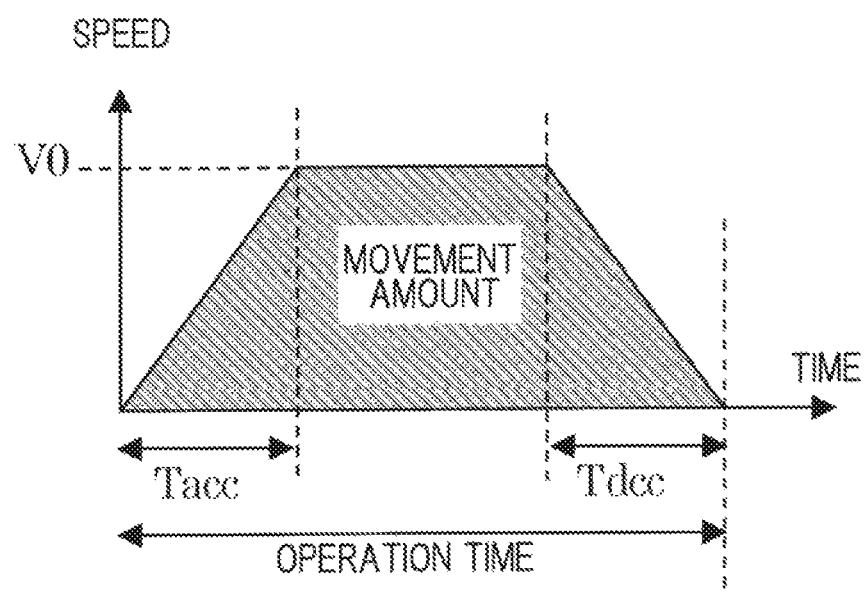
FIG. 7 shows an example of a correspondence table for the working device.
FIG. 8 is a graph showing an exemplary relationship between operation time and speed controlled by a control unit of the working device.

In the present embodiment, the storage unit 3 also stores a correspondence table 3a that specifies postures $\theta$Pi, $\varphi$Pi (i=1, 2, 3 . . . ) of the distal-side link hub 13 and acceleration and deceleration times TPi (i=1, 2, 3 . . . ) for the respective target positions (P1, P2, P3, . . . ), in addition to the target positions P. FIG. 7 shows an example of the correspondence table 3a. The correspondence table 3a is, in other words, a correlation table. The acceleration and deceleration times TPi refer to a set acceleration time Tacc and a set deceleration time Tdcc where the actuators 11 (11-1 to 11-3) perform a point-to-point operation in a trapezoidal motion having acceleration, constant velocity and deceleration phases, as shown in an example of operation time and speed in FIG. 8. Although the set acceleration time Tacc and the set deceleration time Tdcc may be different values, the acceleration and deceleration times Tpi have the same values in the present embodiment (FIG. 7).

The acceleration and deceleration times TPi for each target position (P1, P2, P3, . . . ) in the correspondence table 3a may be any suitable value determined by a test or simulation. The acceleration and deceleration times TPi for each target position (P1, P2, P3, . . . ) may be, for example, calculated and set on the basis of the rigidities of the parallel link mechanism 10 in the postures at least at two positions of the current position and the target position.

In FIG. 1, the calculation unit 4 sequentially reads out the respective target positions stored in the storage unit 3 and calculates movement amounts and movement speeds of the respective actuators 11 (11-1 to 11-3) between the target positions. The relationship between the posture ($\theta$, $\varphi$) of the parallel link mechanism 10 and the movement amounts of the respective actuators 11 (11-1 to 11-3) can be determined by formula (1) given below.

The control unit 5 operates the respective actuators 11 (11-1 to 11-3) by the movement amounts and at the movement speeds of the respective actuators 11 (11-1 to 11-3) calculated by the calculation unit 4. The control unit 5 is capable of changing the acceleration and deceleration times of the respective actuators 11 (11-1 to 11-3) for each target position P. In the present embodiment, the control unit 5 operates the respective actuators 11 (11-1 to 11-3) with the acceleration and deceleration times read out from the correspondence table 3a for each target position P.

The input unit 8 is used to perform setting and/or update of a content stored in the storage unit 3. The input unit 8 may be a keyboard or a touch panel on an image display unit that can be operated by an operator to perform input, or may be a means for performing input by reading a storage media or by data communication. In this example, the input unit 8 is configured to allow an operator to change the acceleration and deceleration times for each target position P in the storage unit 3 by manual input.

Exemplary Operation and Supplementary Description of Features

Hereinafter, exemplary operation of the above features and supplementary description of the features are provided. Before describing control operations, a relationship between operations of respective components of the link actuation device will be described. The link actuation device to be controlled has a bend angle θ, a turn angle φ, and a rotation angle βn (β1, β2, β3) of each proximal-side end link members 15, which has a relationship expressed by the following formula (1):

$$\cos(\theta/2)\sin \beta n - \sin(\theta/2)\sin(\varphi + \delta n)\cos \beta n + \sin(\gamma/2) = 0 \quad \text{formula (1)}$$

As used herein, γ denotes an angle formed between an axis of a connected end of each of the intermediate link members 17 rotatably coupled to the proximal-side end link members 15, respectively, and an axis of a connected end of each of the intermediate link members 17 rotatably coupled to the distal-side end link members 16. Also, δn (δ1, δ2, δ3) (not illustrated) denotes a separation angle, in a circumferential direction, of each of the proximal-side end link members 15 from the proximal-side end link member 15 that serves as a reference. Where there are three link mechanisms 14 provided at equal intervals in the circumferential direction, the separation angles δ1, δ2, δ3 of the respective proximal-side end link members 15 are 0°, 120°, 240°, respectively.

It should be noted that where the storage unit 3 stores the target positions P as orthogonal coordinates (X, Y, Z), the calculation unit 4 or the control unit 5 converts the orthogonal coordinates into polar coordinates (θ, φ). This conversion can be univocally performed by a conversion formula (description omitted).

Control by Acceleration and Deceleration Times for Each Target Position

In the working device 1, in cases where a resonance frequency of the link actuation device 7 is used for setting acceleration and deceleration times of the actuators 11 (11-1, 11-2, 11-3) for operating the working device 1, if a resonance frequency in a predetermined posture (e.g., origin posture) is used in a conventional manner, the rigidities of the link actuation device 7 vary depending on the posture and movement direction, causing vibration to occur.

In the present embodiment, however, acceleration and deceleration times of each actuator 11 (11-1, 11-2, 11-3) can be changed for each target position P when the link actuation device 7 is operated from one posture (one target position P) to a next posture (next target position P). Thus, the acceleration and deceleration times can be set for each target position using a resonance frequency according to the posture of the distal-side link hub 13 in the target position P and the movement direction of the distal-side link hub 13. This makes it possible to suppress vibration during high-speed positioning in a target position P in which the rigidity is different from that in a predetermined posture.

In cases where the acceleration and deceleration times of the respective actuators 11 (11-1, 11-2, 11-3) are changed for each target position P, the storage unit 3 stores the correspondence table 3a (FIG. 7) that specifies the acceleration and deceleration times for each target position P, and the control unit 6 operates the respective actuators 11 (11-1, 11-2, 11-3) with the acceleration and deceleration times read out for each target position P from the correspondence table 3a. By use of the correspondence table 3a, it is possible to set acceleration and deceleration times for each target position P according to the posture and movement direction of the distal-side link hub 13 and to operate the actuators by simple control.

In the present embodiment, in addition to the control using the correspondence table 3a, the input unit 8 allows an operator to change the acceleration and deceleration times by manual input. In this case, the correspondence table 3a may be rewritten in response to an input command from the input unit 8, or the control unit 5 may use the acceleration and deceleration times for each target position P that are inputted through the input unit 8, separately from the correspondence table 3a. Thus, by allowing an operator to change the acceleration and deceleration times by manual input, it is possible to suppress vibration during high-speed positioning more easily at a target position P at which the rigidity is different from that in a predetermined posture.

Correspondence Table 3b for Divided Posture

Figure 9A:
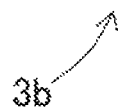
FIG. 9A shows an example of the correspondence table for the working device.

Instead of the correspondence table 3a, a correspondence table 3b may be stored, the table specifying acceleration and deceleration times T0, T5, T10, . . . for each predetermined posture defined by dividing an operable range of the distal-side link hub 13 as shown in FIG. 9A. In the example of FIG. 9A, the respective predetermined postures are defined by bend angles which are separated by 5° (i.e., 0° , 5° , 10°, . . . ).

The control unit 5 calculates acceleration and deceleration times for each target position P1, P2, P3, . . . using the corresponding acceleration and deceleration times T0, T5, T10, . . . for each predetermined posture in correspondence table 3b and uses the calculated acceleration and deceleration times in control.

Figure 9B:
FIG. 9B shows another example of the correspondence table for the working device.

As for a way of dividing, although the operable range of the distal-side link hub 13 is divided on the basis of the "bend angle" in the example of FIG. 9A, it is also possible to divide the range on the basis of the "turn angle" as shown in FIG. 9B or on the basis of a combination of the "bend angle" and the "turn angle" as shown in FIG. 9C. Where division is based on such a combination, the acceleration and deceleration times are more finely divided (e.g., T0, 0; T0, 5; T5, 10; . . . ; T5, 0; T5, 5; T5, 10; . . . ). However, it is generally preferable to divide the range on the basis of not only the "turn angle," but also the "bend angle" such that the bend angle does not have a predominant influence on the rigidity.

Thus, by using the acceleration and deceleration times for each predetermined posture defined by dividing the operable range of the distal-side link hub 13, it is also possible to reduce the time required to set the acceleration and deceleration times and to suppress vibration during high-speed positioning by simple control in a target position in which the rigidity is different from that in a predetermined posture. In this case, the control unit 5 may be configured to calculate the acceleration and deceleration times for each target position P1, P2, P3, . . . by linear approximation from the acceleration and deceleration times for each predetermined posture, Use of linear approximation makes it easy to calculate acceleration and deceleration times for each target position P.

Examples in FIG. 9A to FIG. 9C

Although the posture of the link actuation device 7 is defined by a bend angle θ and a turn angle φ, each predetermined posture is defined only by a bend angle θ in the example of FIG. 9A because the rigidity before movement does not change regardless of the turn angle φ. Thus, the control can be simplified. It should be noted that "each predetermined posture" may be defined by both of a bend angle θ and a turn angle φ, and acceleration and deceleration times may be set for each posture defined by both of the bend angle θ and the turn angle φ (FIG. 9C).

Figure 10:
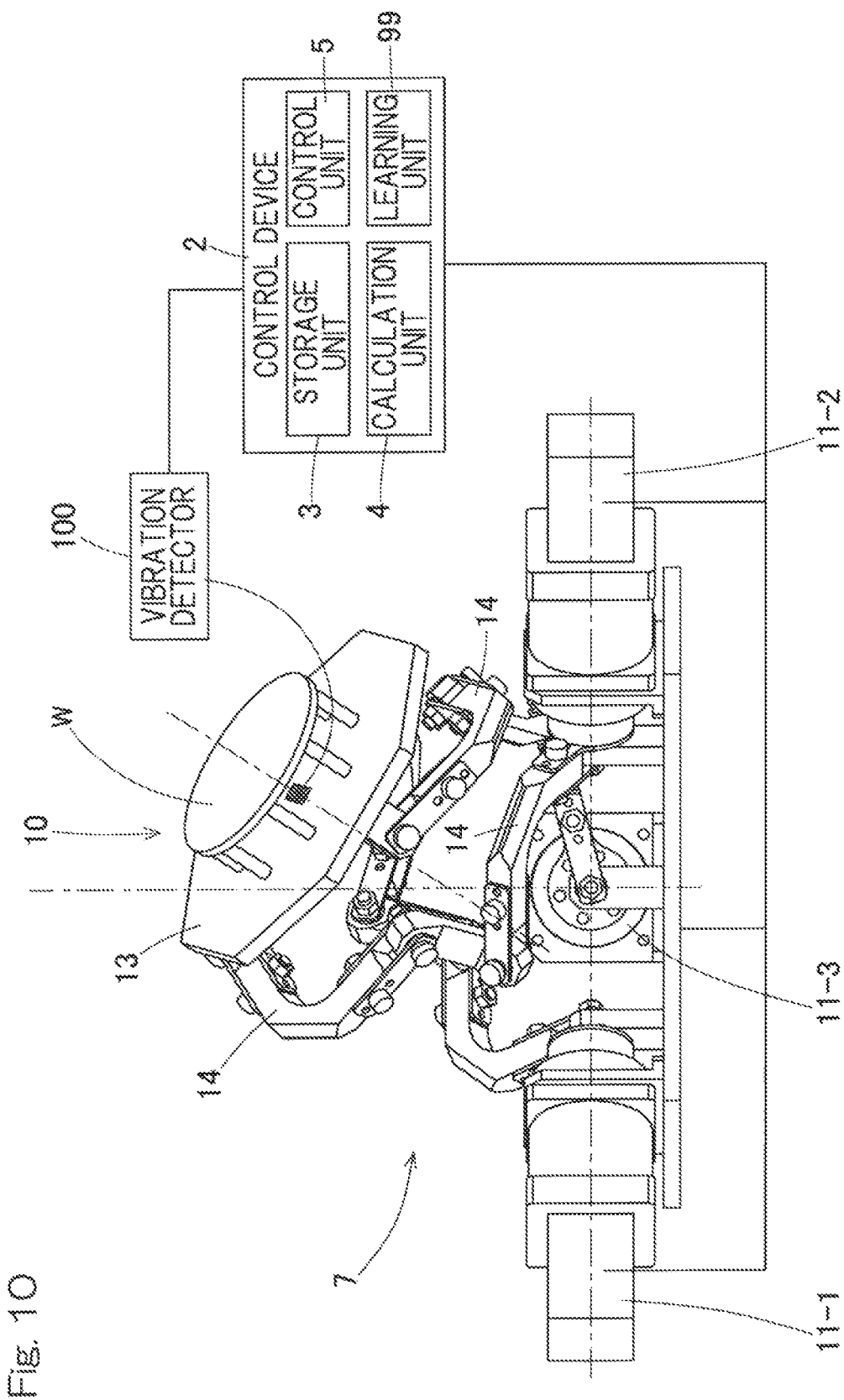
FIG. 10 shows a perspective view of a working device using a parallel link mechanism according to a second embodiment of the present invention in combination with a block diagram of a control device.

Second Embodiment in FIG. 10

FIG. 10 shows a second embodiment. This embodiment is the same as the first embodiment, unless otherwise specifically described. In the second embodiment, a vibration detector 100 configured to detect vibration of the distal-side link hub 13 is provided, and the control device 5 includes a learning unit 99. The learning unit 99 is configured to learn relevance among postures of the distal-side link hub 13 and directions of movement of the distal-side link hub 13, the vibration of the distal-side link hub 13, and the acceleration and deceleration times and to use learned data to set the acceleration and deceleration times in the storage unit 3. The control unit 5 uses the acceleration and deceleration times set in the storage unit 3 to change the acceleration and deceleration times of each of the actuators 11 (11-1, 11-2, 11-3) for each target position P.

Thus, by providing a learning function, the acceleration and deceleration times are automatically set for each target position P, even where the size and/or weight of the loaded workpiece W is/are changed. This makes it possible to easily suppress vibration during high-speed positioning in a target position P in Which the rigidity is different from that in a predetermined posture. It should be noted that the learning unit also learns how vibration changes when the size and/or weight of the loaded workpiece W changes. Even where the size and/or weight of a loaded workpiece changes, there is no change in the tendency (distribution) of, e.g., in what posture the rigidity is high or low and in which force application direction the rigidity is high or low, but the magnitude of the rigidity changes.

Figure 11:
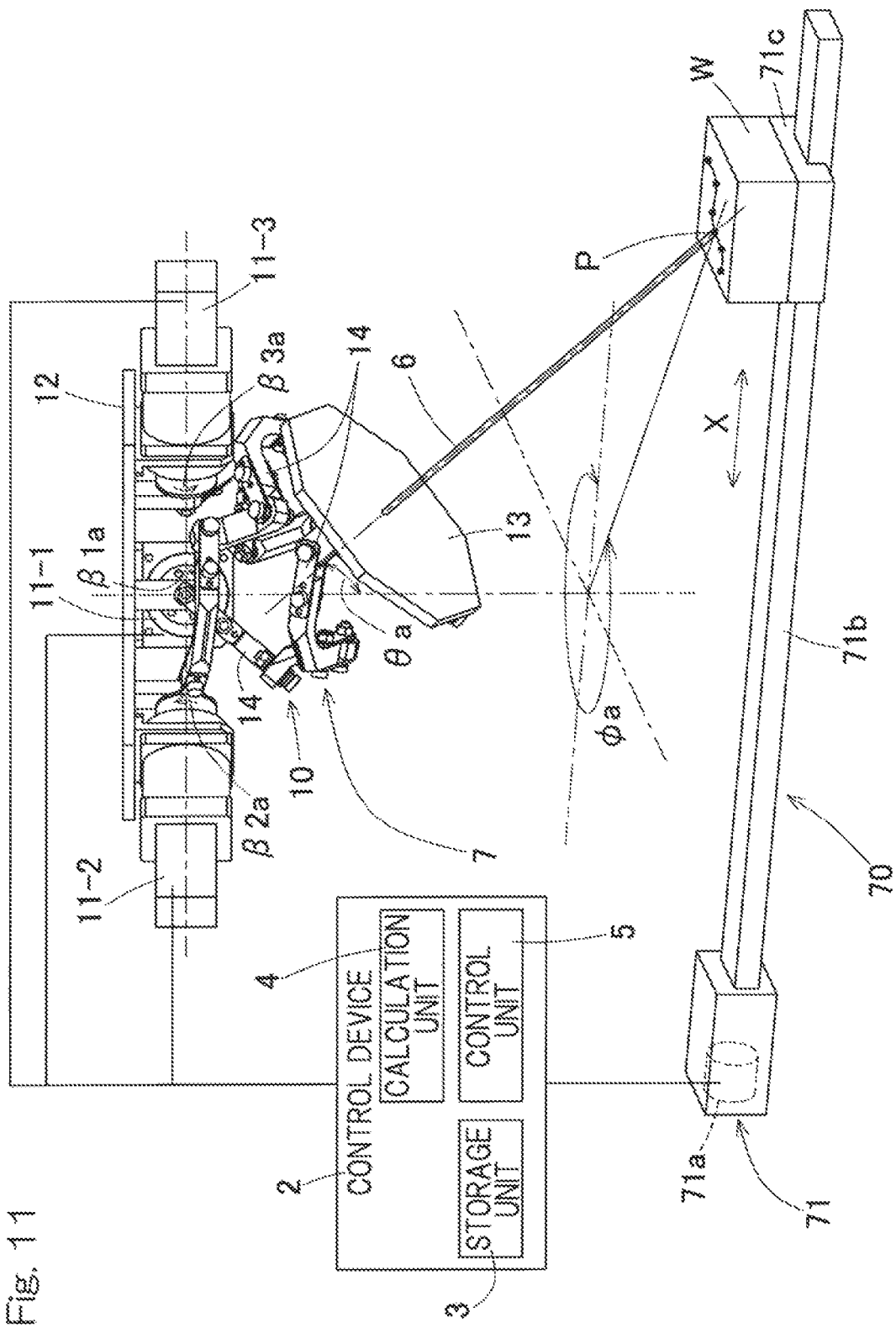
FIG. 11 shows a perspective view of a working device using a parallel link mechanism according to a third embodiment of the present invention in combination with a block diagram of a control device.

Third Embodiment in FIG. 11

FIG. 11 shows a third embodiment of the present invention. A working device 1 according to the third embodiment includes a link actuation device 7 described in the first embodiment with reference to FIG. 1 and a combined-side actuator 71 disposed in combination with the link actuation device 7. The actuator 71 constitutes a combined mechanism 70.

The combined-side actuator 71 is a single-axis linear actuator. Specifically, the actuator includes a mobile stage 71*c* configured to freely advance and retreat along a rail 71*b* in a left and right directions (X-axis directions), and the mobile stage 71*c* is caused to advance and retract by a motor 71*a* that is a drive source. A workpiece W is placed on the mobile stage 71*c*. The rotation of the motor 71*a* is transmitted between the mobile stage 71*c* and the rail 71*b* through a rotation-linear motion converting mechanism (not illustrated), such as a ball screw or a rack-pinion mechanism. The motor 71*a* may be installed in the mobile stage 71*c* or be provided to the rail 71*b*. The mobile stage 71*c* has an upper surface on which the work point P of the end effector 6 is located.

The storage unit 3 of the control device 2 stores a plurality of target positions P. The plurality of target positions P are coordinates of the respective work points within a work space at which the end effector 6 carries out work. The calculation unit 4 sequentially reads out the respective target positions P stored in the storage unit 3 to calculate movement amounts and movement speeds of the respective actuators 11 (11-1, 11-2, 11-3), 71 between the target positions P. The control unit 5 operates the respective actuators 11 (11-1, 11-2, 11-3), 71 by the movement amounts and at the movement speeds of the respective actuators 11 (11-1, 11-2, 11-3), 71 calculated by the calculation unit 4. The control unit 5 is capable of changing the acceleration and deceleration times of each actuators 11 (11-1, 11-2, 11-3), 71 to be moved.

Control in Each Operation Mode

The control device 2 is capable of changing operation modes in which one or both of the link actuation device 7 and the single-axis linear actuator 71 are operated. Selection of the operation modes may be performed by a mode switching means (not illustrated) such as a mode selection switch or performed according to a content stored in the storage unit 3 in association with the respective target positions P. The operation modes may include: a first operation mode in which only the link actuation device 7 operates; a second operation mode in which only the linear actuator 71 operates; and a third operation mode in which the link actuation device 7 and the linear actuator 71 synchronously operate. By switching the acceleration and deceleration times for each target position P depending on the operation modes, it is possible to suppress vibration and perform precise positioning at high speed.

For example, in the first operation mode in which only the link actuation device 7 operates, the acceleration and deceleration times of the respective posture control actuators 11 (11-1, 11-2, 11-3) are set for each target position P in the storage unit 3 according to the posture and the movement direction of the distal-side link hub 13. This makes it possible to suppress vibration and perform precise positioning at high speed.

As another example, in the second operation mode in which only the linear actuator 71 operates, whereas the link actuation device 7 does not operate, appropriate acceleration and deceleration times of the linear actuator 71 are set to be the acceleration and deceleration times that are set according to the target position P in the storage unit 3, instead of the acceleration and deceleration times that is set in accordance with the posture and the movement direction of the distal-side link hub 13. This makes it possible to suppress vibration and perform precise positioning at high speed.

As yet another example, in the third operation mode the link actuation device 7 and the linear actuator 71 synchronously operate, appropriate acceleration and deceleration times of the linear actuator 71 are set to be integer multiples of the acceleration and deceleration times for the respective actuators 11 (11-1, 11-2, 11-3) of the link actuation device 7. This makes it possible to suppress vibration and perform precise positioning at high speed.

Correspondence Table of Acceleration and Deceleration Times for Each Target Position A method of setting acceleration and deceleration times in the first operation mode in which only the link actuation device 7 operates involves creating a correspondence table (correlation table) 3a in which, for each target position P, a posture of the distal-side link hub 13 at that position, a movement direction of the distal-side link hub, and acceleration and deceleration times are associated with each other, as described in the embodiment shown in FIG. 1 with reference to FIG. 7. This makes it possible to set acceleration and deceleration times according to the posture and movement direction of the distal-side link hub 13 for each target position P, and therefore, vibration during high-speed positioning can be suppressed in a target position P in which the rigidity is different from that in a predetermined posture.

Correspondence Table of Each Divided Angle and Linear Interpolation

Another method of setting acceleration and deceleration times in the first operation mode in which only the link actuation device 7 operates involves creating a correspondence table (correlation table) 3b of acceleration and deceleration times that can suppress vibration at each predetermined bend angle that is obtained by dividing the operable range, in advance prior to starting operation, as described in the embodiment shown in FIG. 1 with reference to FIG. 9A. During operation, the calculation unit 4 or the control unit 5 uses the acceleration and deceleration times associated with a bend angle that is close to a bend angle θ at each target position P in the correspondence table 3b, to calculate acceleration and deceleration times for that target position P by linear interpolation. The acceleration and deceleration times for that target position P are used to operate the respective actuators 11 (11-1, 11-2, 11-3).

This makes it possible to reduce the time required to set the acceleration and deceleration times and to suppress vibration during high-speed positioning in the target position in which the rigidity is different from that in a predetermined posture. A correspondence table (correlation table) (not illustrated) including not only the bend angle θ but also the turn angle may also be used.

Figure 12:
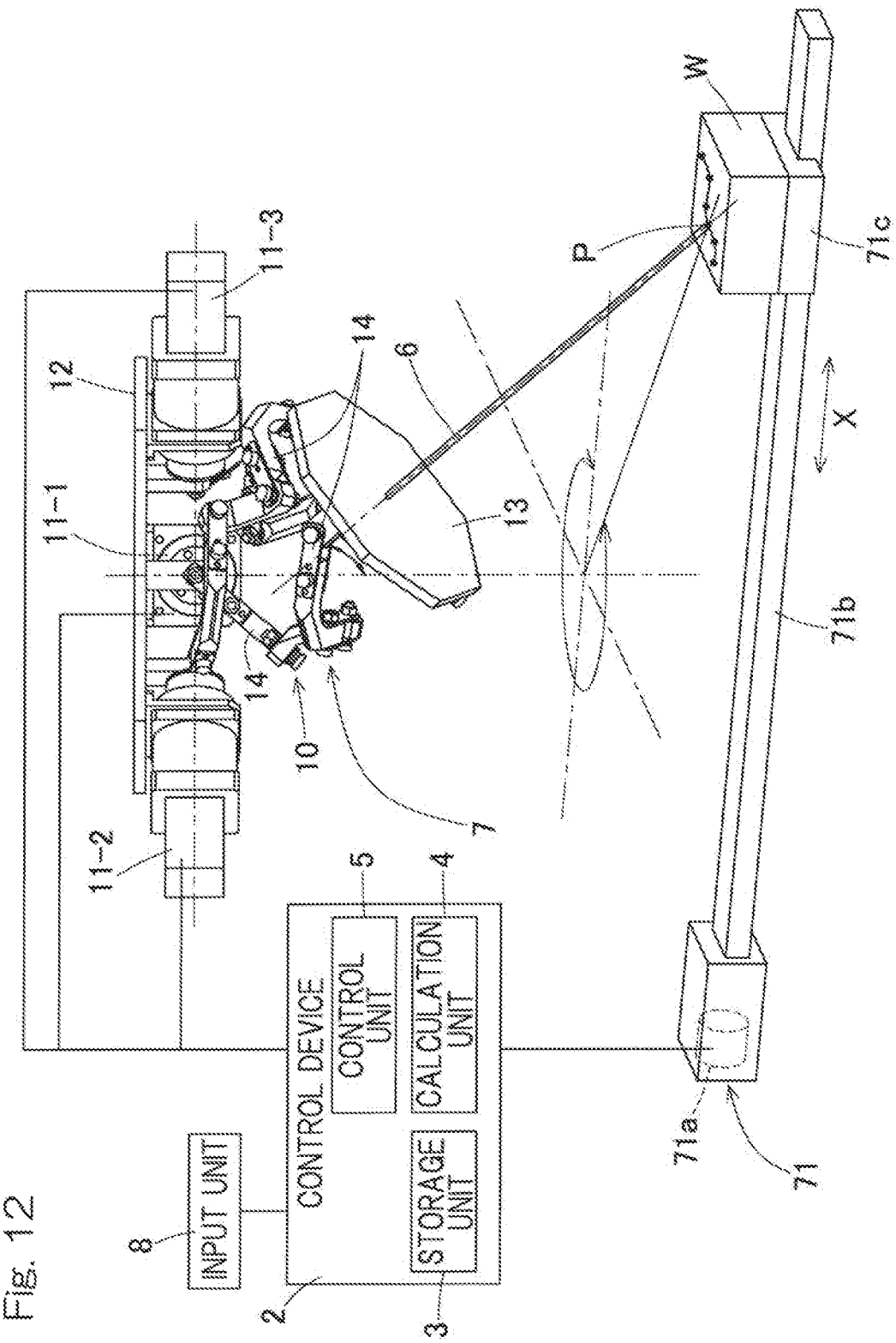
FIG. 12 shows a perspective view of a working device using a parallel link mechanism according to a fourth embodiment of the present invention in combination with a block diagram of a control device.

Manual Input by Operator, Fourth Embodiment in FIG. 12

A method of setting acceleration and deceleration times in the first operation mode in which only the link actuation device 7 operates as shown in FIG. 12 may involve providing an input unit 8 for inputting acceleration and deceleration times as described in the first embodiment with reference to FIG. 1, and carrying out a test operation to manually set, by an operator, the acceleration and deceleration times for each target position P in the storage unit 3 while checking a resonance frequency and a vibration state. This makes it possible to suppress vibration during high-speed positioning in a target position P in which the rigidity is different from that in a predetermined posture.

Figure 13:
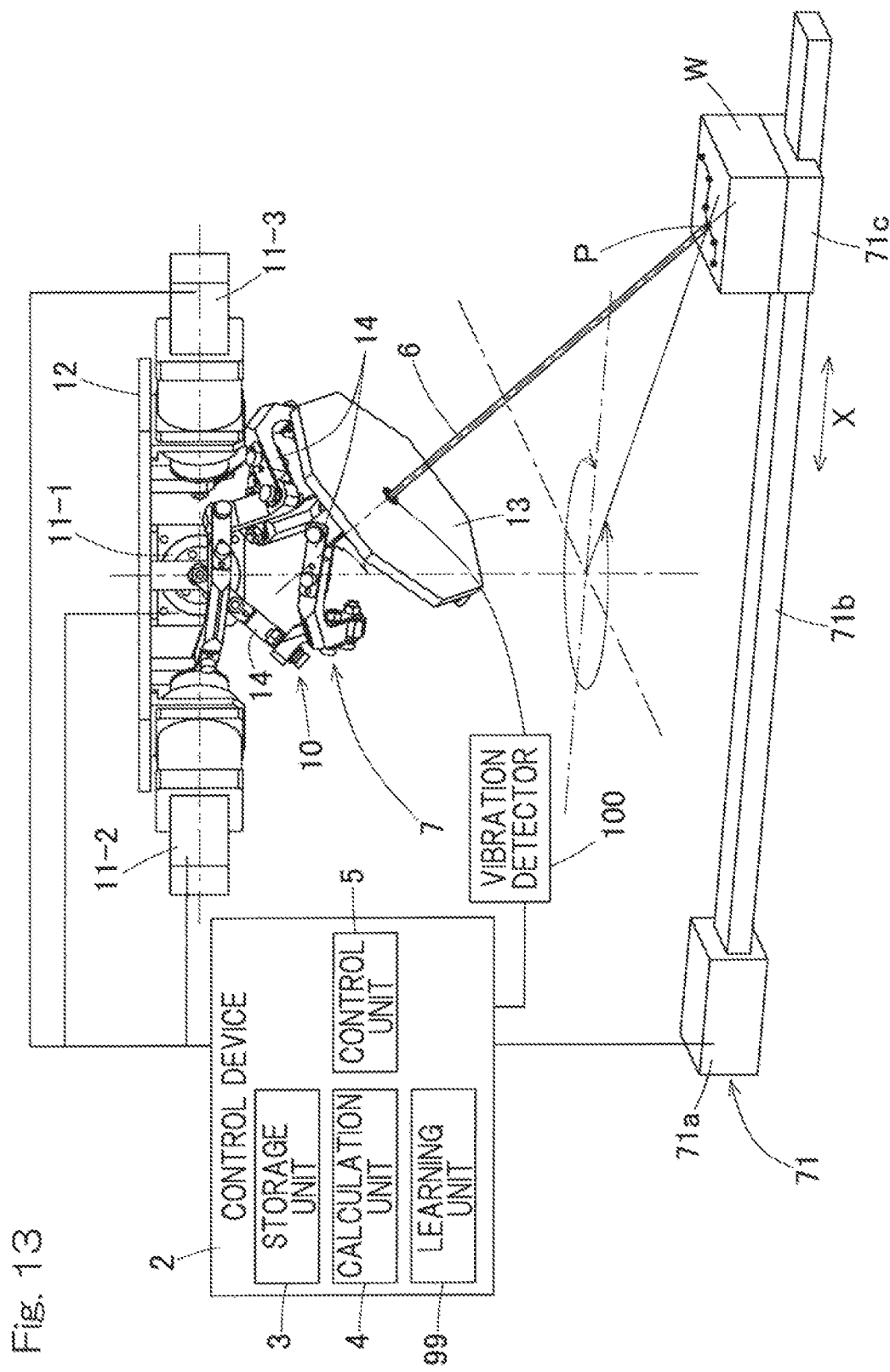
FIG. 13 shows a perspective view of a working device using a parallel link mechanism according to a fifth embodiment of the present invention in combination with a block, diagram of a control device.

Determination of Acceleration and Deceleration Times by Artificial Intelligence, Fifth Embodiment in FIG. 13

A method of setting acceleration and deceleration times in the first operation mode in which only the link actuation device 7 operates as shown in FIG. 13 may involve providing a vibration detector 100 at a distal end of the parallel link mechanism 10 as in the same manner as the second embodiment shown in FIG. 10 and providing a learning unit 99 and a storage processing unit (not illustrated) in the control device 2. The storage processing unit stores, in the storage unit 3, the posture and movement direction of the distal-side link hub 13, the acceleration and deceleration times of the respective actuators 11 (11-1, 11-2, 11-3), and magnitude of vibration detected by the vibration detector 100 in each target position P in which work is currently being performed.

The learning unit 99 is so-called artificial intelligence and is configured to mechanically learn data stored in the storage unit 3 and use a learning result to automatically set optimal acceleration and deceleration times in the storage unit 3 according to a change in the size and/or weight of a loaded workpiece. The setting may be performed by update process. This makes it possible to easily set the acceleration and deceleration times even where the size and/or weight of a loaded workpiece is changed and to suppress vibration during high-speed positioning in the target position in which the rigidity is different from that in a predetermined posture.

Combination of Methods of Setting Acceleration and Deceleration Times

The methods of setting acceleration and deceleration times may be used in combination. For example, it is possible to calculate acceleration and deceleration times by using a correspondence table 3a of the bend angles θ and acceleration and deceleration times, to carry out a test operation to check an actual vibration level, and to adjust the acceleration and deceleration times by an operator. It is also possible to adjust acceleration and deceleration speeds (acceleration speed and deceleration speed), instead of the acceleration and deceleration times. As long as a commanded speed is the same, adjustment of the acceleration and deceleration speeds automatically changes the acceleration and deceleration times at the same time, providing the same effect.

Figure 14:
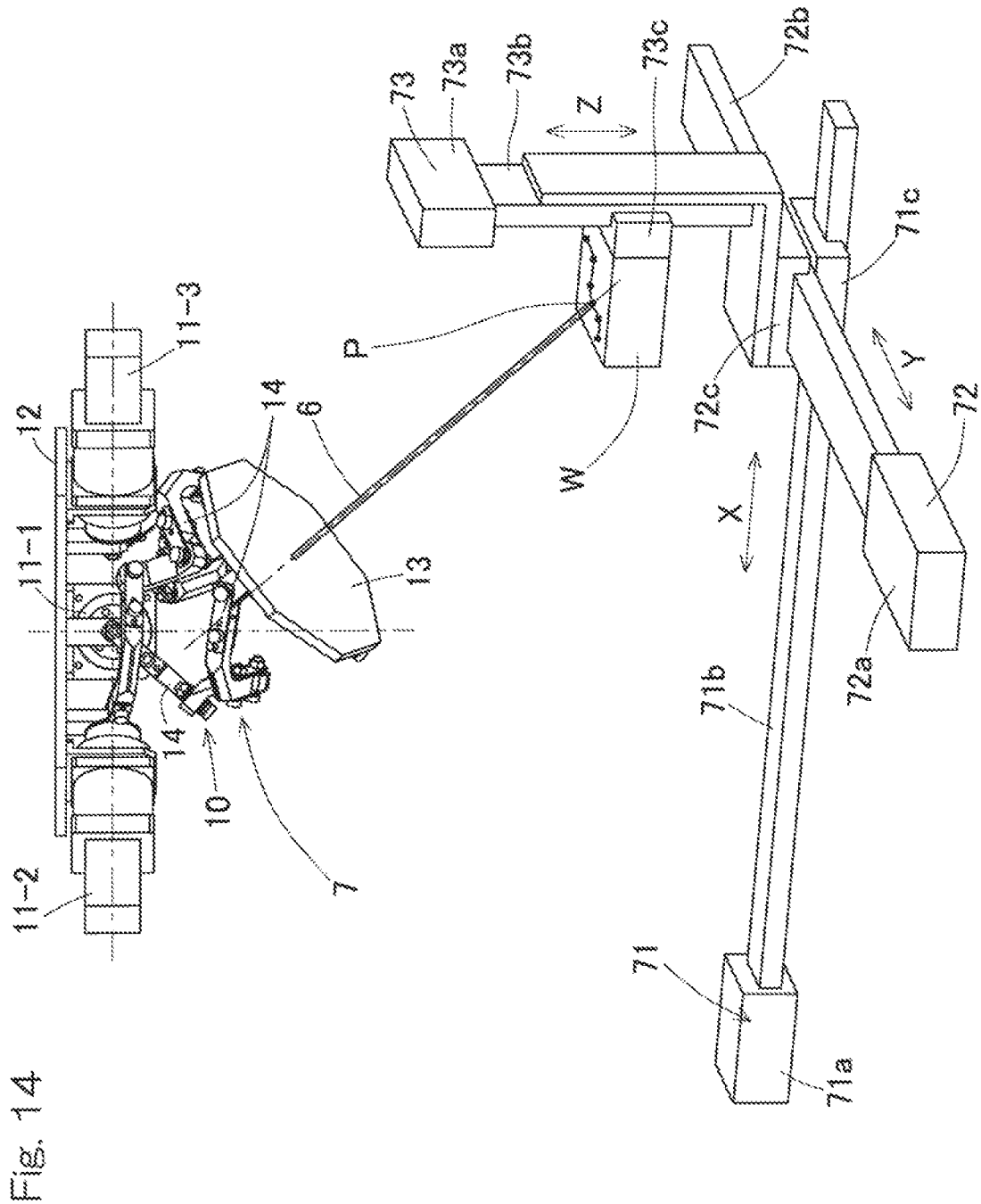
FIG. 14 is a perspective view of a working device using a parallel link mechanism according to a sixth embodiment of the present invention.

Sixth Embodiment in FIG. 14

Although the third to fifth embodiments shown in FIG. 11 to FIG. 13 are directed to methods of setting acceleration and deceleration times in an assembly in which the link actuation device 7 and the single-axis linear actuator 71 are combined, it is possible to set acceleration and deceleration times for each target position in a working device 1 in which the link actuation device 7 and a plurality of linear actuators are combined as shown in FIG. 14, in the same manner as any of the third to fifth embodiments. A sixth embodiment shown in FIG. 14 includes first to third linear actuators 71-73 that having movement directions in three-axis directions (X, Y, Z directions) that are orthogonal to each other. These three linear actuators 71-73 constitute a combined mechanism 70.

Each of the linear actuators 71-73 includes a mobile stage 71c-73c that is capable of advancing and retreating along a rail 71b-73b. Each mobile stage 71c-73c is caused to advance and retract by a motor 71a-73a that is a drive source. The rotation of the motor 71a is transmitted between the mobile stage 71c and the rail 71b through a rotation-linear motion converting mechanism (not illustrated), such as a ball screw or a rack-pinion mechanism. The motor 71a may be installed in the mobile stage 71c or be provided to the rail 71b. Each of the second and third linear actuators 72, 73 has a rail 72b-73b provided on the mobile stage 71c, 72c of the linear actuator 71, 72 located below, and a workpiece W is placed on the uppermost mobile stage 71c.

According to this configuration, in the first operation mode in which only the link actuation device 7 operates, acceleration and deceleration times are set in, e.g., the correspondence table 3a in the storage unit 3 according to the posture and movement direction of the distal-side link hub 13. In the second operation mode in which only one of the plurality of linear actuators 71-73 operates, whereas the link actuation device 7 does not operate, appropriate acceleration and deceleration times of the relevant linear actuator 71-73 are set in the storage unit 3. This makes it possible to suppress vibration and perform precise positioning at high speed.

In the third operation mode in which at least two actuators 11 (11-1, 11-2, 11-3), 71-73 of the link actuation device 7 and the plurality of linear actuators 71-73 synchronously operate, it is possible to suppress vibration and perform precise positioning at high speed by setting appropriate acceleration and deceleration times for the actuators.

Figure 15:
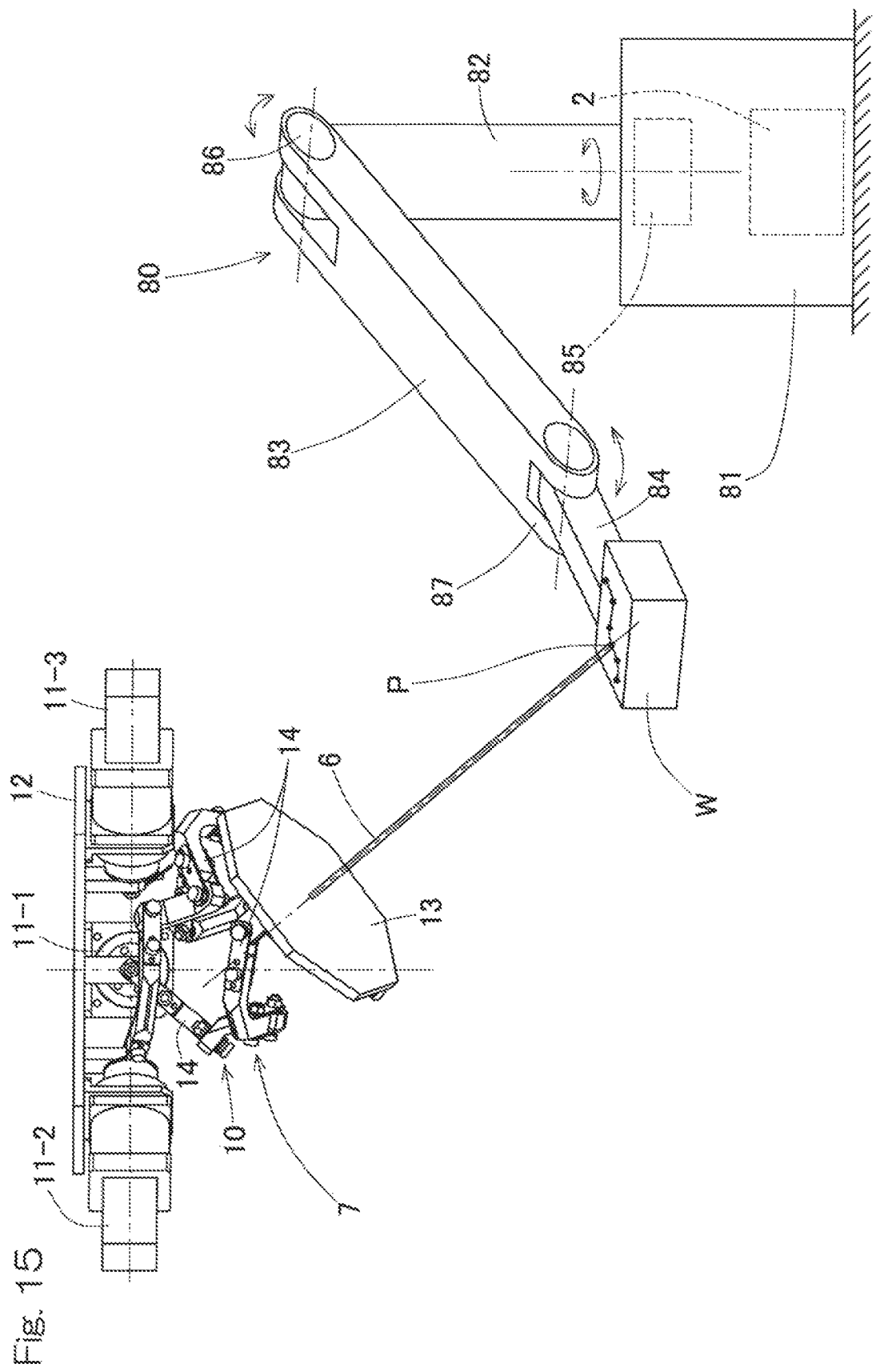
FIG. 15 is a perspective view of a working device using a parallel link mechanism according to a seventh embodiment of the present invention.

Seventh Embodiment in FIG. 15

A seventh embodiment shown in FIG. 15 is an example in which the link actuation device 7 is combined with a combined mechanism that is a vertical articulated robot 80. The vertical articulated robot 80 includes a base unit 81 provided with a first arm 82 that vertically extends upward so as to be rotatable about a vertical axis and is caused to rotate by power of a first actuator 85. The first arm 82 has a distal end provided with a second arm 83 that is rotatable about a first horizontal axis and is caused to rotate by power of a second actuator 86. The second arm 83 has a distal end provided with a third arm 84 that is rotatable about a second horizontal axis parallel to the first horizontal axis and is caused to rotate by power of a third actuator 87. The third arm 84 has a distal end on which the link actuation device 7 is arranged. The first to third actuators 85-87 constitute combined-side actuators.

The control device 2 have the same configuration as that of the control device 2 of the working device 1 according to the third embodiment shown in FIG. 11, unless otherwise specifically described. It should be noted that the control device 2 is configured to control the respective actuators 85-87 of the combined mechanism 80.

In the seventh embodiment, in the first operation mode in which only the link actuation device 7 operates, acceleration and deceleration times are set for each target position P in the correspondence table 3a in the storage unit 3 according to the posture and movement direction of the distal-side link hub 13. In the second operation mode in which only the vertical articulated robot 80 operates, acceleration and deceleration times are set so as to be used in the operation of the vertical articulated robot 80. In the third operation mode in which the link actuation device 7 and the vertical articulated robot 80 synchronously operate, appropriate acceleration and deceleration times are set for them. This makes it possible to suppress vibration and perform precise positioning at high speed.

Figure 16:
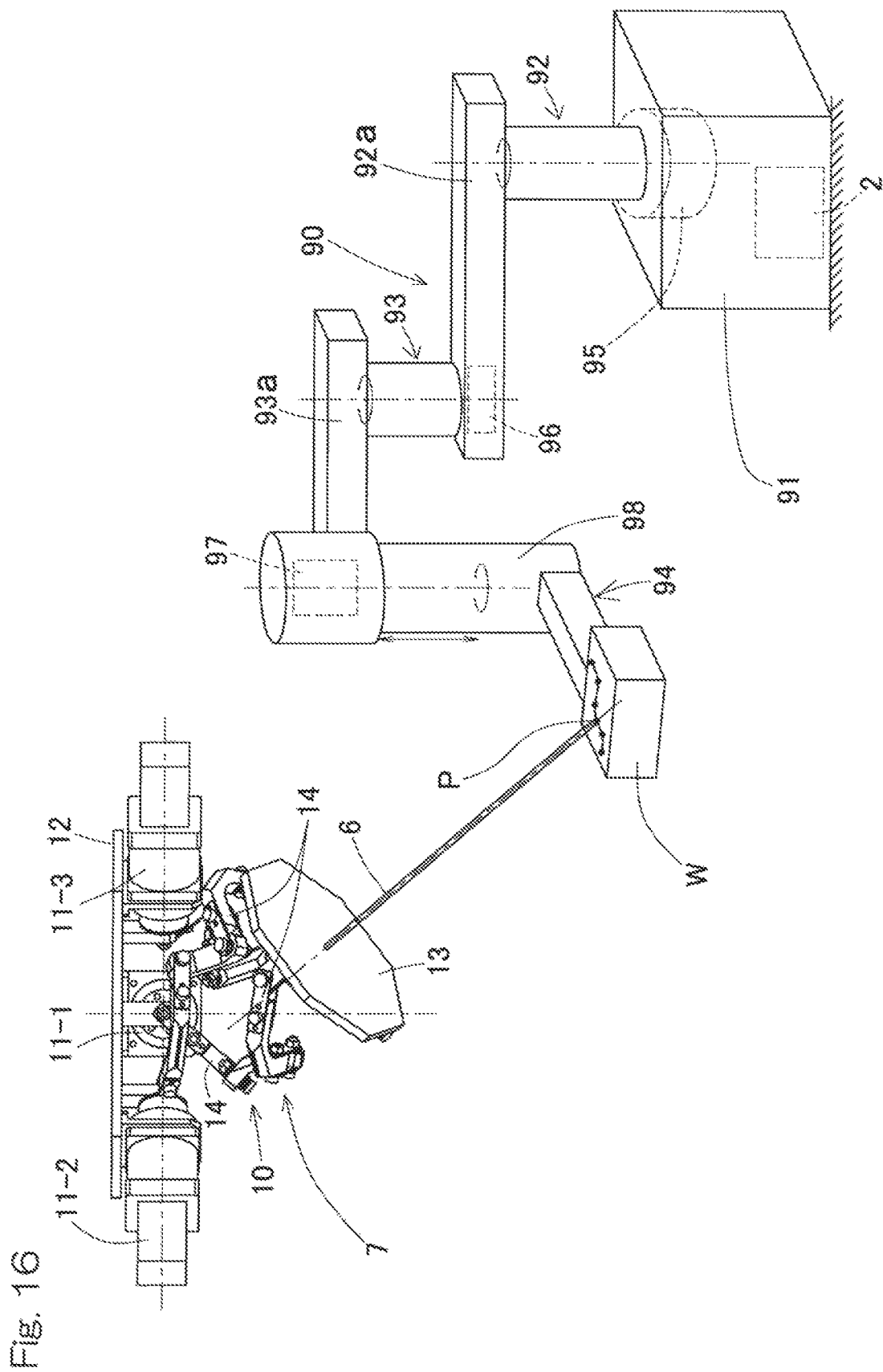
FIG. 16 is a perspective view of a working device using a parallel link mechanism according to an eighth embodiment of the present invention.
Figure 17:
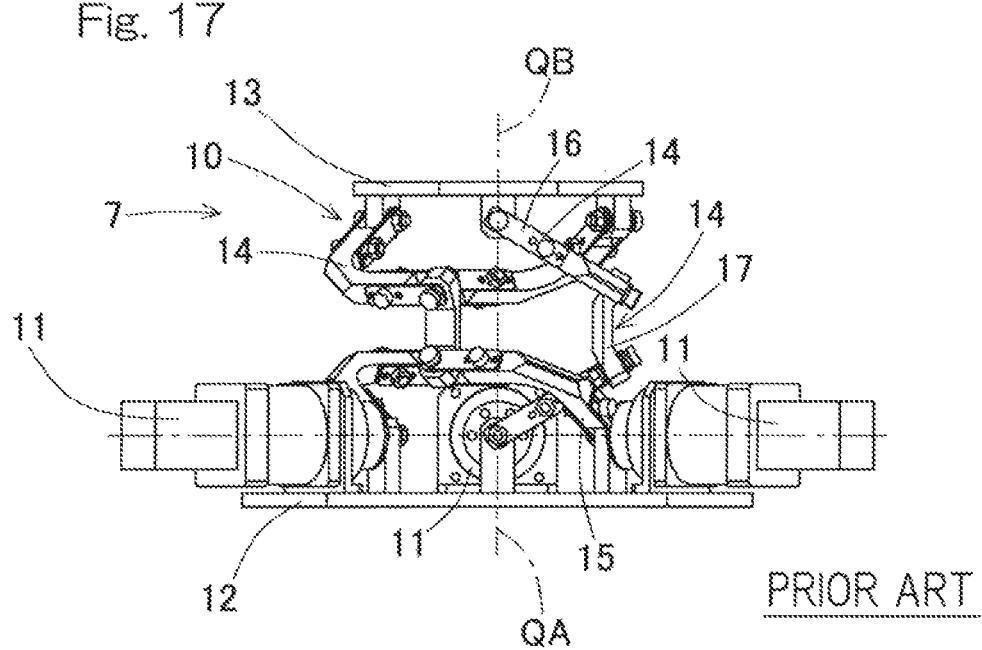
FIG. 17 is a perspective view of a conventional working device using a parallel link mechanism.
Figure 18:
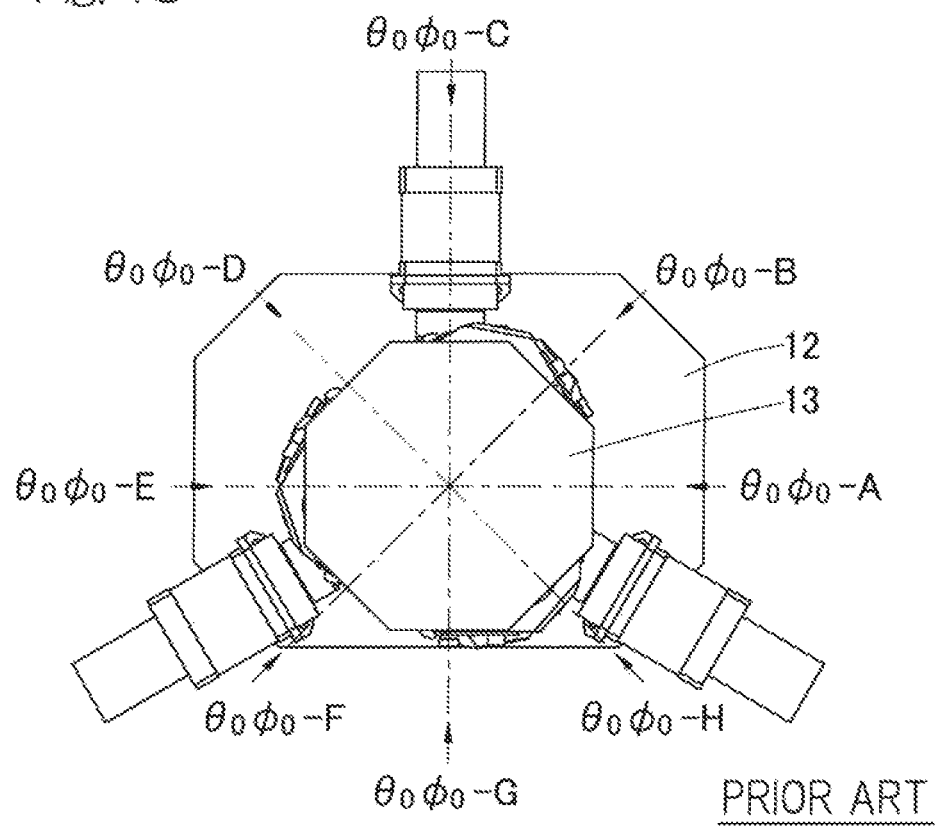
FIG. 18 is a plan view of the working device.
Figure 19:
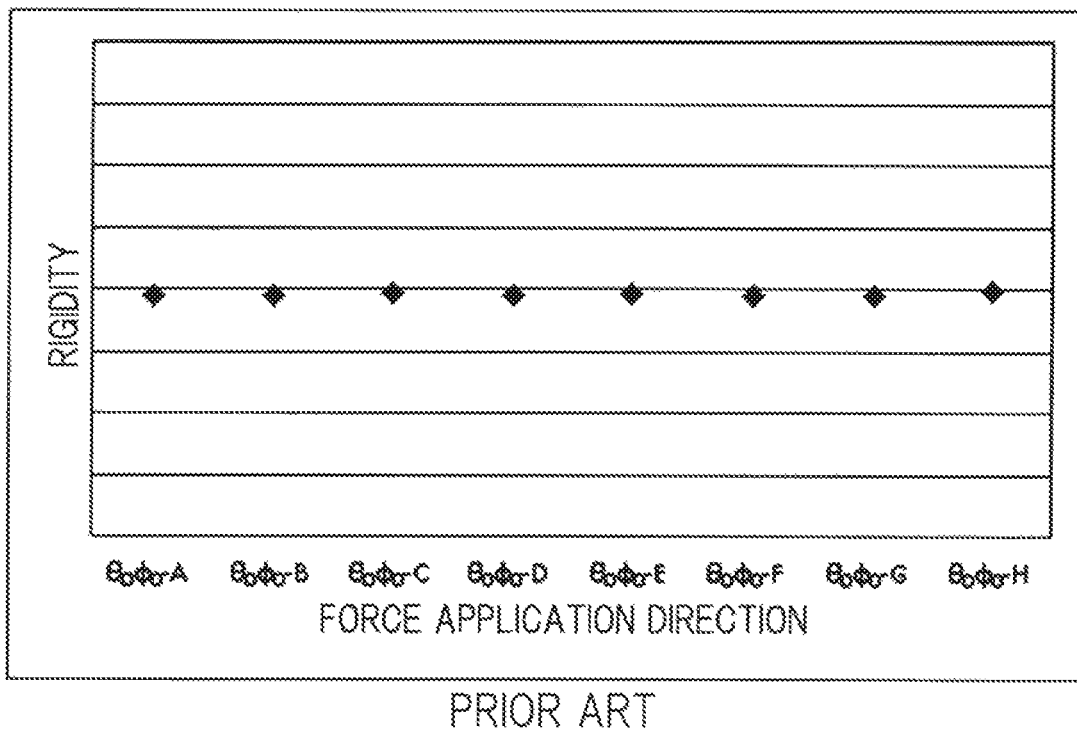
FIG. 19 is a graph showing a relationship between force application directions and rigidity of the working device.
Figure 20:
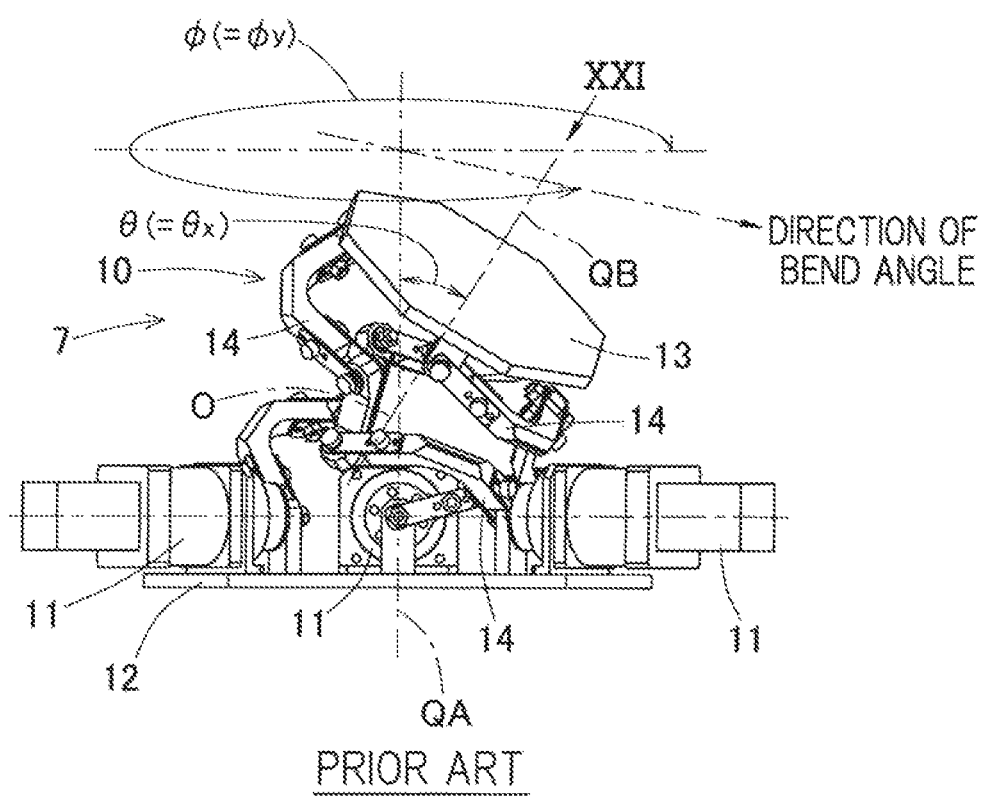
FIG. 20 illustrates a bend angle and a turn angle of the working device.
Figure 21:
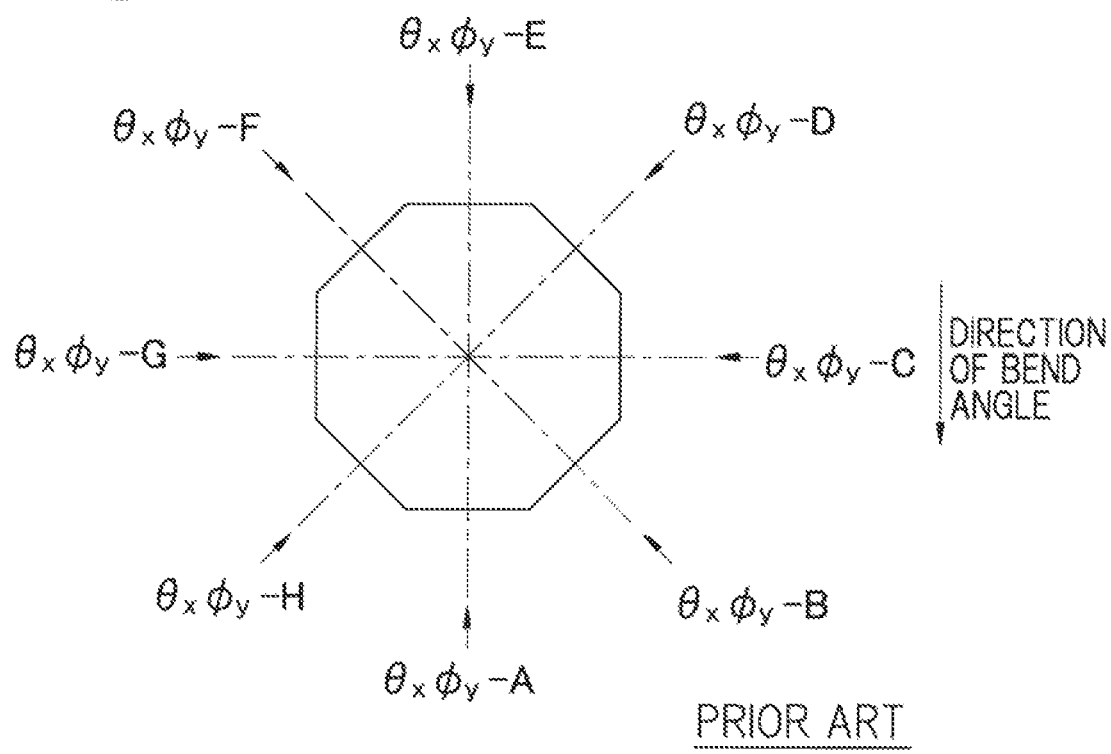
FIG. 21 illustrates a distal-side link hub when viewed from XXI direction shown in FIG. 20.
Figure 22:
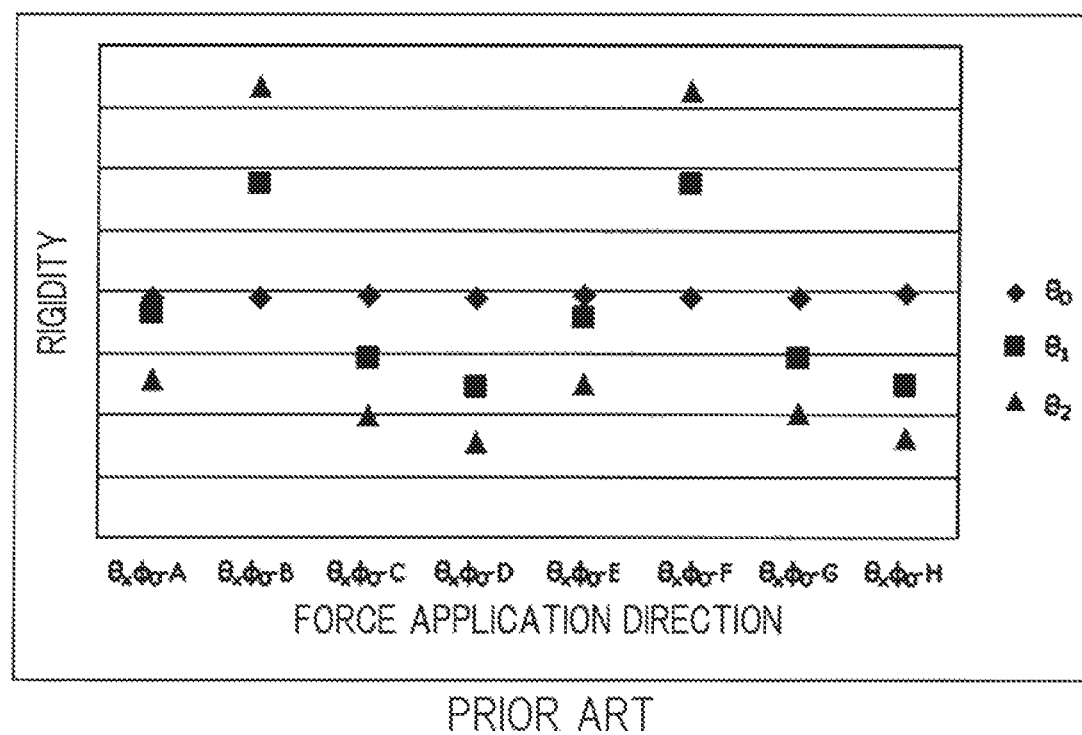
FIG. 22 is a graph showing another example of the relationship between force application directions and rigidity of the working device.
Figure 23:
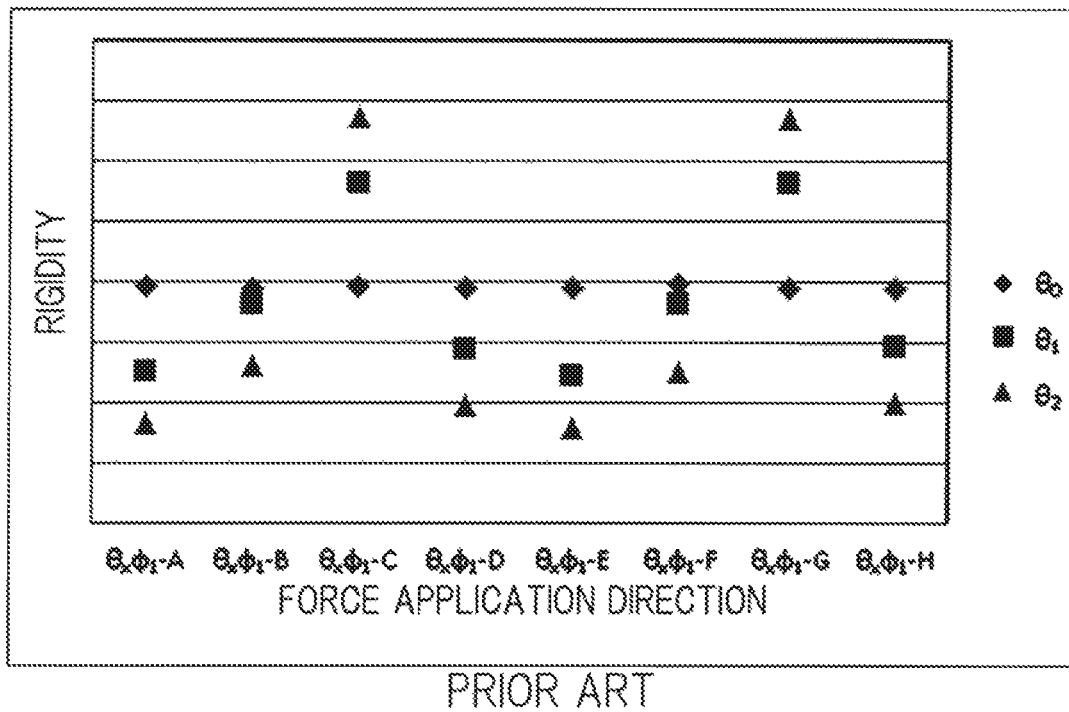
FIG. 23 is a graph showing yet another example of the relationship between force application directions and rigidity of the working device.
Figure 24:
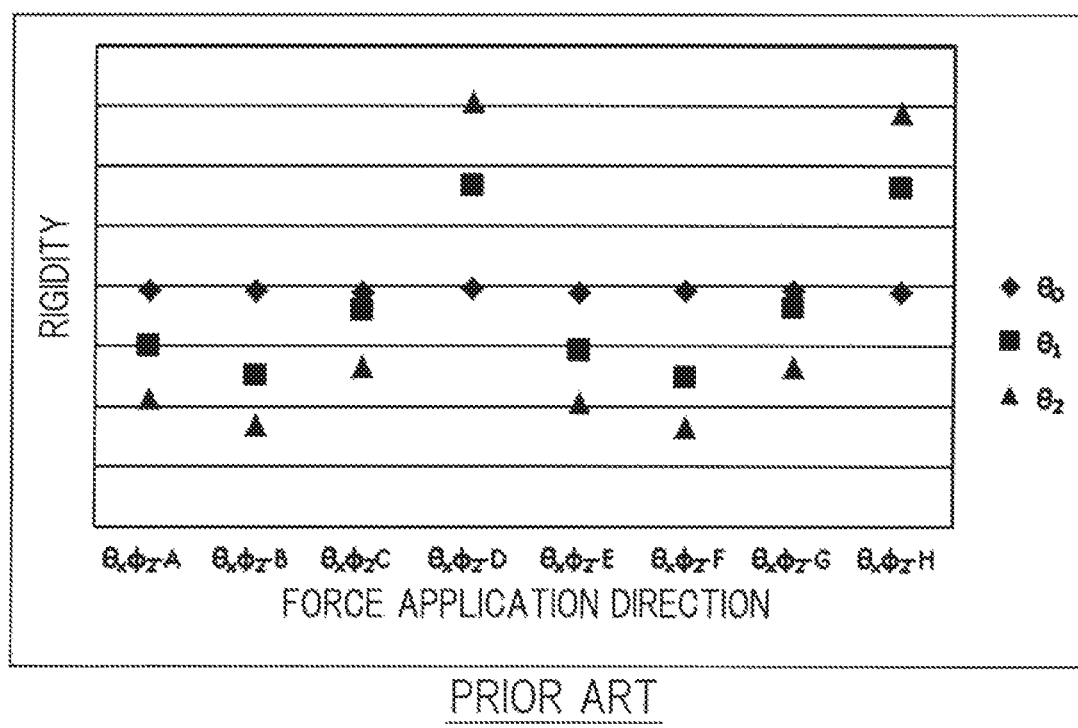
FIG. 24 is a graph showing still another example of the relationship between force application directions and rigidity of the working device.
Figure 25:
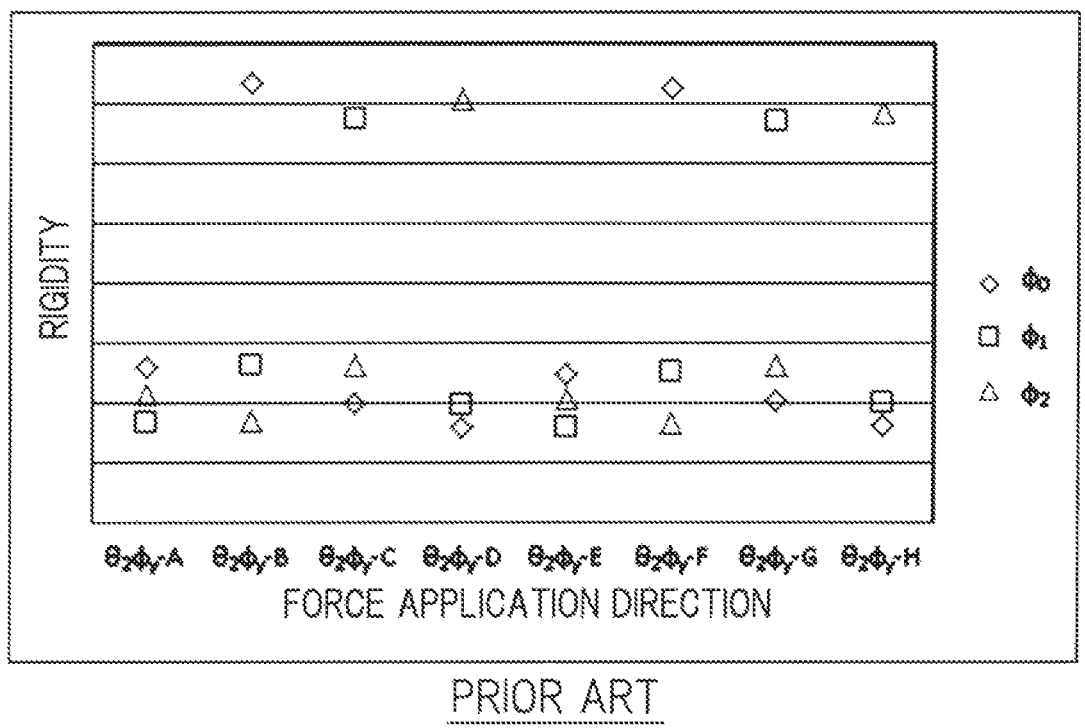
FIG. 25 is a graph showing a still further example of the relationship between force application directions and rigidity of the working device.

Eighth Embodiment in FIG. 16

FIG. 16 shows an eighth embodiment of the present invention. The eighth embodiment is an example in which the link actuation device 7 is combined with a combined mechanism that is a horizontal articulated robot 90. The horizontal articulated robot 90 includes a base unit 91 provided with a first arm 92 that vertically extends upward so as to be horizontally turnable. The first arm 92 has an upper end provided with a horizontal arm part 92a, and the horizontal arm part 92a has a distal end at which a second arm 93 is disposed so as to be rotatable about a vertical axis. The second arm 93 has an upper end provided with a horizontal arm part 93a, and the horizontal arm part 93a has a distal end at which a third arm 94 is disposed as a linear motion mechanism capable of moving up and down.

An actuator 95 that turnably drives the first arm 92, an actuator 96 that turnably drives the second arm 93, an actuator 97 that serves as a rotation mechanism for rotating the third arm 94 and a linear actuator 98 that moves the third arm 94 up and down constitute combined-side actuators for the link actuation device 7.

In the working device 1 in which the link actuation device 7 and the horizontal articulated robot 90 are combined, in the first operation mode in which only the link actuation device 7 operates, acceleration and deceleration times are set for each target position P in the correspondence table 3a in the storage unit 3 according to the posture and movement direction of the distal-side link hub 13. In the second operation mode in which only the horizontal articulated robot 90 operates, acceleration and deceleration times are set so as to be used in the operation of the horizontal articulated robot 90. In the third operation mode in which the link actuation device 7 and the horizontal articulated robot 90 synchronously operate, appropriate acceleration and deceleration times are set for them. This makes it possible to suppress vibration and perform precise positioning at high speed.

Another Embodiment

Although, in the third to eighth embodiments shown in FIG. 11 to FIG. 16, the link actuation device 7 and other actuators 71-73, 85-87, 95-98 are separately disposed such that the end effector 6 and the workpiece W are respectively disposed on one or the other, the link actuation device 7 and other actuators 71-73, 85-87, 95-98 may be integrally disposed. For example, the proximal-side link hub 12 of the link actuation device 7 may be provided to any of other actuators 71-73, 85-87, 95-98, or the end effector 6 may be attached to the distal-side link hub 13 of the link actuation device 7, with any of other actuators 71-73, 85-87, 95-98 interposed.

In such a case, where there are a plurality of other actuators 71-73, 85-87, 95-98, it is possible to dispose some of such actuators 71-73, 85-87, 95-98 integrally with the link actuation device 7 while separately disposing the rest of such actuators 71-73, 85-87, 95-98, or dispose all the actuators integrally with the link actuation device 7.

Possible arrangement may include: not only an arrangement in which the end effector 6 is provided in the link actuation device 7 while the workpiece W is disposed on any of other actuators 71-73, 85-87, 95-98; but also an arrangement in which the workpiece W is disposed in the link actuation device 7 while the end effector 6 is provided to any of other actuators 71-73, 85-87, 95-98; and an arrangement in which one of the end effector 6 and the workpiece W is arranged in a fixed manner While the other is moved by the link actuation device 7 and other actuators 71-73, 85-87, 95-98.

Although the preferred embodiments of the present invention have been described with reference to the drawings, the present invention is not limited to the embodiments described above, and various additions, modifications, or deletions may be made without departing from the scope of the invention. Accordingly, such variants are included within the scope of the present invention.

REFERENCE NUMERALS

1 . . . Working device
2 . . . Control device
3 . . . Storage unit
3a, 3b . . . Correspondence table
4 . . . Calculation unit
5 . . . Control unit
6 . . . End effector
7 . . . Link actuation device
8 . . . Input unit
10 . . . Parallel link mechanism
11, 11-1, 11-2, 11-3 . . . Posture change actuator
12 . . . Proximal-side link hub
13 . . . Distal-side link hub
14 . . . Link mechanism
15 . . . Proximal-side end link member
16 . . . Distal-side end link member
17 . . . Intermediate link member
70 . . . Combined mechanism
71-73, 85-87, 95-98 . . . Combined-side actuator
80 . . . Articulated robot (combined mechanism)
90 . . . Horizontal articulated robot (combined mechanism)
99 . . . Learning unit
100 . . . Vibration detector
P, P1, P2, P3 . . . Target position

What is claimed is:

1. A working device using a parallel link mechanism, the working device comprising:
a link actuation device including:
a proximal-side link hub; a distal-side link hub; three or more link mechanisms each coupling the distal-side link hub to the proximal-side link hub such that a posture of the distal-side link hub is changed relative to the proximal-side link hub; and posture control actuators provided to two or more link mechanisms of the three or more link mechanisms and configured to arbitrarily change the posture of the distal-side link hub relative to the proximal-side link hub; and
each of the link mechanisms including: a proximal-side end link member having one end rotatably coupled to the proximal-side link hub; a distal-side end link member having one end rotatably coupled to the distal-side link hub; and an intermediate link member having opposite ends rotatably coupled to other ends of the proximal-side end link member and the distal-side end link member; and
a control device configured to control each of the posture control actuators to change the posture of the distal-side link hub relative to the proximal-side link hub such that a position determined based on the distal-side link hub is changed from a current position to a target position,
wherein the control device includes:
a storage unit configured to store a plurality of target positions;
a calculation unit configured to sequentially read out respective target positions stored in the storage unit to calculate movement amounts and movement speeds of respective posture control actuators between the target positions; and
a control unit configured to operate the respective posture control actuators by the movement amounts and at the movement speeds of the respective posture control actuators calculated by the calculation unit, and
the control unit is configured to change acceleration and deceleration times of the posture control actuators for each of the target positions.

2. The working device using the parallel link mechanism as claimed in claim 1, further comprising:
an input unit configured to allow an operator to change the acceleration and deceleration times for each target position in the storage unit by manual input, and
wherein the control unit is configured to operate the posture control actuators with the acceleration and deceleration times read out from the storage unit for each target position.

3. The working device using the parallel link mechanism as claimed in claim 1, further comprising:
a vibration detector configured to detect vibration of the distal-side link hub; and
a learning unit provided in the control device, wherein
the learning unit is configured to learn relevance among postures of the distal-side link hub and directions of movement of the distal-side link hub, the vibration of the distal-side link hub, and the acceleration and deceleration times and to use learned data to set the acceleration and deceleration times in the storage unit, and
the control unit is configured to use the acceleration and deceleration times set in the storage unit to change the acceleration and deceleration times of each of the posture control actuators for each target position.

4. The working device using the parallel link mechanism as claimed in claim 1, wherein
the storage unit is configured to store a correspondence table that specifies the acceleration and deceleration times for each predetermined posture defined by dividing an operable range of the distal-side link hub, and
the control unit is configured to use the acceleration and deceleration times in the correspondence table to calculate the acceleration and deceleration times for each target position for use in control.

5. The working device using the parallel link mechanism as claimed in claim 4, wherein the control unit is configured to calculate the acceleration and deceleration times of each target position by linear approximation from the acceleration and deceleration times in the correspondence table.

6. The working device using the parallel link mechanism as claimed in claim 1, wherein
the storage unit is configured to store a correspondence table that specifies the acceleration and deceleration times for each target position, and the control unit is configured to operate the posture control actuators with the acceleration and deceleration times that are read out from the correspondence table for each target position.

7. The working device using the parallel link mechanism as claimed in claim 6, wherein the acceleration and deceleration times for each target position in the correspondence table are acceleration and deceleration times of each of the posture control actuators which are calculated based on rigidities of the parallel link mechanism in at least two postures in the current position and the target position.

8. The working device using the parallel link mechanism as claimed in claim 7, wherein the acceleration and deceleration times for each target position in the correspondence table are the acceleration and deceleration times for each target position which are calculated by linear approximation of change in rigidities between two postures including a posture at a change start position, at which the posture starts to be sequentially changed to the respective target positions, and a posture at a final target position.

9. A working device using a parallel link mechanism, the working device comprising:
  a link actuation device including:
    a proximal-side link hub; a distal-side link hub; three or more link mechanisms each coupling the distal-side link hub to the proximal-side link hub such that a posture of the distal-side link hub is changed relative to the proximal-side link hub; and posture control actuators provided to two or more link mechanisms of the three or more link mechanisms and configured to arbitrarily change the posture of the distal-side link hub relative to the proximal-side link hub;
    each of the link mechanisms including: a proximal-side end link member having one end rotatably coupled to the proximal-side link hub; a distal-side end link member having one end rotatably coupled to the distal-side link hub; and an intermediate link member having opposite ends rotatably coupled to other ends of the proximal-side end link member and the distal-side end link member; and
  an end effector attached to the distal-side link hub;
  a single-axis or multi-axis combined-side actuator combined with the link actuation device; and
  a control device configured to control the posture control actuators and the combined-side actuator, wherein
  the control device includes:
    a storage unit configured to store a plurality of target positions that are coordinates of respective work points within a work space at which the end effector carries out work;
    a calculation unit configured to sequentially read out respective target positions stored in the storage unit to calculate movement amounts and movement speeds of respective posture control actuators between the target positions; and
    a control unit configured to operate the respective posture control actuators by the movement amounts and at the movement speeds of the respective posture control actuators calculated by the calculation unit, and
    the control unit is configured to change acceleration and deceleration times of each of the posture control actuators to be moved.

10. The working device using the parallel link mechanism as claimed in claim 5, wherein the link actuation device and the combined-side actuator synchronously operate, and the control device is configured to operate the combined-side actuator with integer multiples of the acceleration and deceleration times of the posture control actuators used where only the link actuation device operates.

11. The working device using the parallel link mechanism as claimed in claim 5, wherein the combined-side actuator does not operate and only the link actuation device operates, and
  the control unit is configured to change the acceleration and deceleration times of each of the posture control actuators for each target position.

12. The working device using the parallel link mechanism as claimed in claim 11, wherein
  the storage unit is configured to store a correspondence table that specifies the acceleration and deceleration times for each target position, and
  the control unit is configured to operate the posture control actuators with the acceleration and deceleration times that are read out from the correspondence table for each target position.

13. The working device using the parallel link mechanism as claimed in claim 11, wherein
  the storage unit is configured to store a correspondence table that specifies acceleration and deceleration times for each predetermined posture defined by dividing an operable range of the distal-side link hub, and
  the control unit is configured to use the acceleration and deceleration times in the correspondence table to calculate the acceleration and deceleration times for each target position for use in control.

14. The working device using the parallel link mechanism as claimed in claim 13, wherein the control unit is configured to calculate the acceleration and deceleration times for each target position by linear approximation from the acceleration and deceleration times for each predetermined posture.

* * * * *